United States Patent
Hayakawa et al.

(10) Patent No.: US 11,068,425 B2
(45) Date of Patent: Jul. 20, 2021

(54) SEMICONDUCTOR DEVICE AND BUS GENERATOR

(71) Applicant: RENESAS ELECTRONICS CORPORATION, Tokyo (JP)

(72) Inventors: Yuki Hayakawa, Tokyo (JP); Toshiyuki Hiraki, Tokyo (JP); Sho Yamanaka, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 122 days.

(21) Appl. No.: 16/438,050

(22) Filed: Jun. 11, 2019

(65) Prior Publication Data

US 2019/0391943 A1   Dec. 26, 2019

(30) Foreign Application Priority Data

Jun. 22, 2018 (JP) .............................. JP2018-118706

(51) Int. Cl.
*G06F 12/14* (2006.01)
*G06F 13/374* (2006.01)

(52) U.S. Cl.
CPC ........ *G06F 13/374* (2013.01); *G06F 12/1458* (2013.01)

(58) Field of Classification Search
CPC ...... G06F 13/16; G06F 12/14; G06F 12/1458; G06F 13/374; G06F 21/85; G06F 12/0862; G06F 2212/6024; G06F 2212/1024; G06F 2221/2141
USPC .................................................. 711/151, 167
See application file for complete search history.

(56) References Cited

U.S. PATENT DOCUMENTS

| | | | | |
|---|---|---|---|---|
| 5,982,360 | A * | 11/1999 | Wu ....................... | H04N 21/443 345/501 |
| 10,528,896 | B2 * | 1/2020 | Rishabh .................. | G06F 9/505 |
| 2013/0111175 | A1 * | 5/2013 | Mogul ..................... | H04L 47/10 711/167 |
| 2015/0339245 | A1 * | 11/2015 | Chakraborty ....... | G06F 13/1673 711/106 |
| 2016/0018878 | A1 * | 1/2016 | Dustman ............... | G06F 1/3287 710/315 |
| 2017/0270063 | A1 | 9/2017 | Yamanaka et al. | |

(Continued)

FOREIGN PATENT DOCUMENTS

WO    2017/056132 A1    4/2017

OTHER PUBLICATIONS

"Method and system for shared access connection rights", IP.com Prior Art Database Technical Disclosure, Jan. 30, 2009.*

(Continued)

*Primary Examiner* — Pierre Miche Bataille
(74) *Attorney, Agent, or Firm* — McDermott Will & Emery LLP

(57) ABSTRACT

A master issues an access request to the memory. The memory controller receives the access request via a bus. An access control unit controls an output of the access request issued by the master to the memory controller by the granting an access right. The access control unit manages a number of grantable rights indicating a number to which the access rights can be granted based on a weight of 0 or more and less than 1 according to a probability that the granted access right is used, and grants the access right within a range of the number of grantable rights.

11 Claims, 12 Drawing Sheets

(56) References Cited

U.S. PATENT DOCUMENTS

2017/0371564 A1* 12/2017 Hou .................. G06F 13/16
2018/0357105 A1* 12/2018 Rishabh ............. G06Q 10/02

OTHER PUBLICATIONS

J. D. Moffett and M. S. Sloman, "The source of authority for commercial access control," in Computer, vol. 21, No. 2, pp. 59-69, Feb. 1988.*
U. Hengartner and P. Steenkiste, "Exploiting Information Relationships for Access Control," Third IEEE International Conference on Pervasive Computing and Communications, Kauai, HI, USA, 2005, pp. 269-278.*

* cited by examiner

US 11,068,425 B2

SEMICONDUCTOR DEVICE AND BUS GENERATOR

CROSS-REFERENCE TO RELATED APPLICATIONS

The disclosure of Japanese Patent Application No. 2018-118706 filed on Jun. 22, 2018 including the specification, drawings and abstract is incorporated herein by reference in its entirety.

BACKGROUND

The present invention relates to a semiconductor device, and, for example, relates to a semiconductor device for accessing a memory.

The present invention also relates to a bus generator for generating a bus in the semiconductor device.

International Publication No. 2017/056132 discloses access control in a bus system in which a plurality of bus masters is connected to a common bus. A semiconductor device described in International Publication No. 2017/056132 includes a plurality of masters, a memory controller, a bus connecting the plurality of masters and the memory controller, and a central bus controller. International Publication No. 2017/056132 discloses that the central bus controller monitors a transfer amount of each master, and selects a master to which an access right is to be granted based on a reserved bandwidth of each master, the monitored transfer amount, and the number of grantable rights.

In International Publication No. 2017/056132, the central bus controller controls granting of an access right to a request issuance control unit of a sub-bus controller corresponding to each master. The request issuance control unit outputs an access request to the memory controller when the access right is granted from the central bus controller and when the master has issued the access request. When the access right is granted and the master has not issued the access request, the request issuance control unit returns the access right to the central bus controller without using the access right. When the access right is not granted from the central bus controller, the request issuance control unit suppresses an output of the access request issued by the master to the memory controller. In other words, in International Publication No. 2017/056132, the request of the master to which the access right is not granted is masked on the bus between the memory controller and the master.

In International Publication No. 2017/056132, the central bus controller receives a buffer release notification from the memory controller when a buffer in the memory controller is released. The central bus controller decreases the number of grantable rights by one each time the access right is granted, and increases the number of grantable rights by one each time the buffer is released. By granting the access right according to a processing state in the memory controller, it is possible to avoid the buffer from becoming full with unprocessed access requests, and it is possible to avoid a situation in which an access request requiring low latency is not accepted by the memory controller.

SUMMARY

Here, in International Publication No. 2017/056132, until the access right granted by the central bus controller reaches the request issuance control unit, it takes several cycles to about 20 cycles depending on the physical distance between the central bus controller and the request issuance control unit. In a case where the access right is returned, similarly, it takes several cycles to about 20 cycles until the returned access right reaches the central bus controller. Until the access right is returned, the central bus controller recognizes that the request issuance control unit uses the access right, and the access right remains consumed during a period from the grant of the access right to the return. Therefore, it is desired to make more effective use of access rights that may be returned.

Other objects and new features will be apparent from the descriptions of the present specification and the accompanying drawings.

According to one embodiment, a semiconductor device includes an access control unit that controls an output of an access request issued by a master to a memory controller by granting an access right. The access control unit manages a number of grantable access rights based on a weight of 0 or more and less than 1 according to a probability that the granted access right is used, and grants the access right within a range of the number of grantable access rights.

According to the above-mentioned embodiment, even under various conditions, congestion of the requests on the bus can be eliminated and the memory efficiency can be increased.

DETAILED DESCRIPTION

Figure 1:
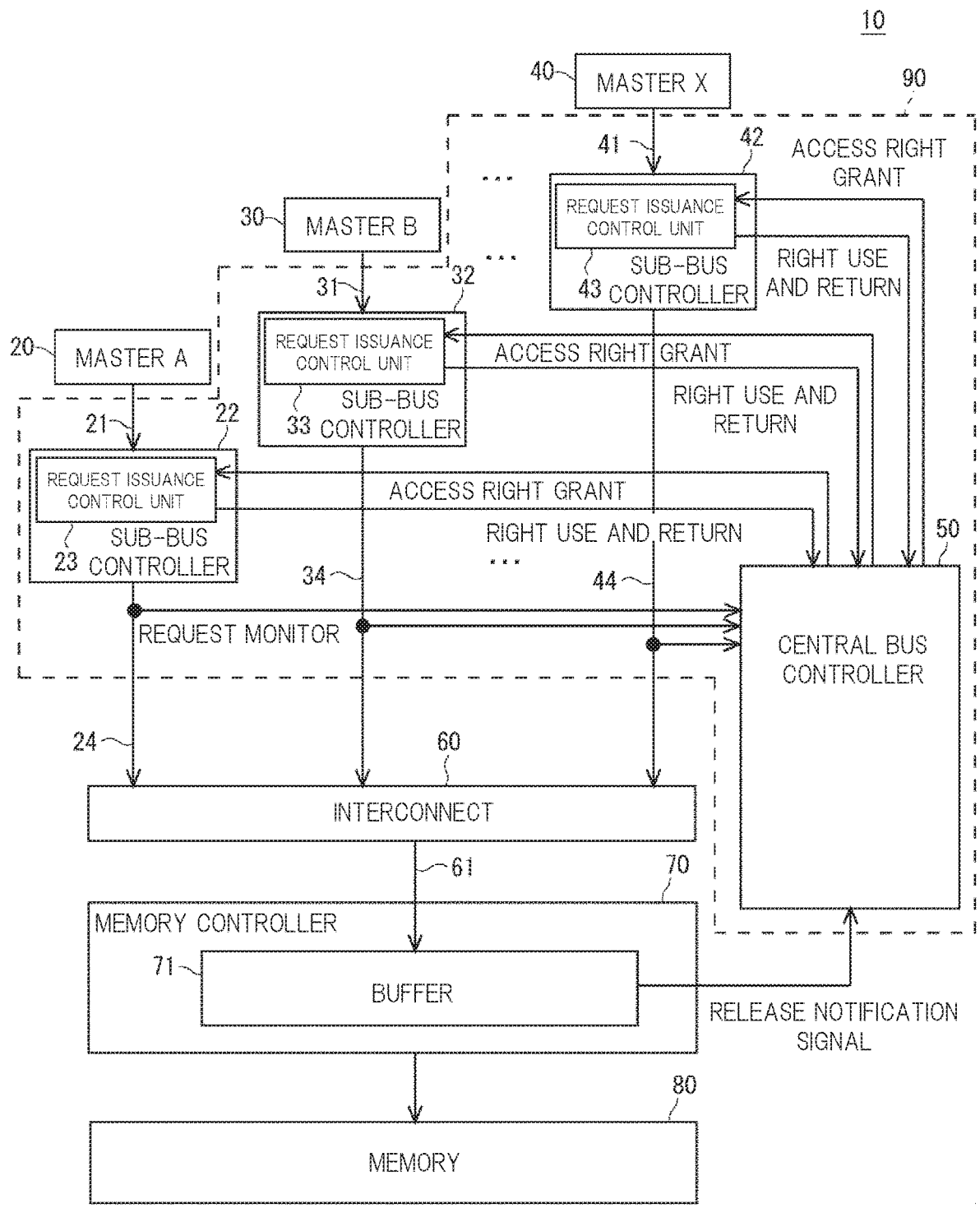
FIG. 1 is a block diagram showing an electronic apparatus including a semiconductor device according to a first embodiment.

Prior to a description of embodiments, a background leading to the following embodiments will be described. In actual products having a master for accessing a Double Data Rate (DDR) memory, the effective bandwidth of the DDR memory varies by about 50% to 75% depending on a situation, and high efficiency has been demanded. In addition, although it is necessary to shorten the access latency of a master requiring real-time performance, this also has a variation, and it is necessary to always set the access latency to a low latency. When latency is allowed to some extent, memory access efficiency can be enhanced by waiting until access requests to the memory are accumulated to some extent in a memory controller, and then performing scheduling in which a processing order of the access requests is changed in consideration of types of the memory accesses (read and write), addresses, and the like. However, in a case of giving priority to a request requiring a low latency with a high priority, is impossible to wait until a certain number of access requests are accumulated in the memory controller, and the number of access requests to be scheduled decreases. Therefore, efficient memory access cannot be realized, and bandwidth efficiency decreases. Accordingly, a memory access system has been required to meet these conflicting requirements.

A use rate of an access right varies depending on a master and a situation, and the number of returned access rights may be small in some situations, while the number of returned access rights may be large in other situations. Stated differently, the use rate of the access right may be high in some situations, while the use rate of the access right may be low in other situations. When the use rate of the access right of each master is high, the memory efficiency is high even if the upper limit of the number of granted access rights (the maximum number of grantable rights) is small. However, it has been found that when the maximum number of the grantable rights is set to a large number in accordance with a situation in which the use rate is low, if the use rate of the access right of each master increases, the access request is congested on the bus and the latency deteriorates. As a result of such consideration, the present inventors have reached the following embodiments.

Preferred embodiments will hereinafter be described with reference to the accompanying drawings. For clarification of the descriptions, the following descriptions and the accompanying drawings are appropriately or partially omitted and simplified. Those elements illustrated in the drawings as functional blocks for performing various processes can be configured with, in a hardware manner, a Central Processing Unit (CPU), a memory, or any other circuits, and can be realized with, in a software manner, programs loaded in the memory. It is understandable by those skilled in the art that those functional blocks can be realized in many forms, for example, by only the hardware, the software, or a combination thereof, and are not limited to any of those. In the illustrations, the same constituent elements are identified by the same reference numerals, and will not described over and over.

The above programs are stored using various types of non-transitory computer readable mediums, and can be supplied to computers. The non-transitory computer readable mediums include various types of substantial recording mediums. Examples of the non-transitory computer readable mediums include a magnetic recording medium (for example, a flexible disk, a magnetic tape, a hard disk), a magneto-optical recording medium (for example, a magneto-optical disk), a Compact Disc-Read Only Memory (CD-ROM) CD-R, a CD-R/W, and a semiconductor memory (for example, a mask ROM, a Programmable ROM (PROM), an Erasable PROM (EPROM), a flash ROM, a Random Access Memory (RAM)). The programs may be supplied to computers using various types of non-transitory computer readable mediums. Examples of the non-transitory computer readable mediums include an electrical signal, an optical signal, and an electromagnetic wave. The non-transitory computer readable mediums can supply programs to computers, through a priority communication path, such as wire and an optical fiber, or a wireless communication path.

In the following preferred embodiments, if necessary for convenience sake, descriptions will be made to divided plural sections or preferred embodiments, however, unless otherwise specified, they are not mutually irrelevant, but one is in relations of modifications, application examples, details, supplementary explanations of a part or whole of the other. Further, in the following preferred embodiments, in the case of reference to the number of an element (including its quantity, numerical value, amount, range), unless otherwise specified and unless clearly limited in principle, the present invention is not limited to the specified number, and a number over or below the specified one may be used.

In the following preferred embodiments, the constituent elements (including the operation steps) are not necessarily indispensable, unless otherwise specified and unless considered that they are obviously required in principle. Similarly, in the following preferred embodiments, in the reference of the forms of the constituent elements or the positional relationships, they intend to include those approximating or similar substantially the forms and like, unless otherwise specified and unless considered that they are obviously not required in principle. This is also true of the foregoing numerical values (including its quantity, numerical value, amount, range).

First Embodiment

FIG. 1 shows an electronic apparatus including a semiconductor device according to a first embodiment. The electronic apparatus 10 includes a master A 20, a master B 30, a master X 40, sub-bus controllers 22, 32, and 42, a central bus controller 50, an interconnect 60, a memory controller 70, and a memory 80. Among components of the electronic apparatus 10, for example, the master A 20, the master B 30, the master X 40, the sub-bus controllers 22, 32, and 42, the central bus controller 50, the interconnect 60, and the memory controller 70 constitute a semiconductor device. Among components of the semiconductor device, for example, the sub-bus controllers 22, 32, and 42, the interconnect 60, and the memory controller 70 may be configured as hardware circuits. The central bus controller 50 may be configured as a circuit including, for example, a processor.

The master A 20, the master B 30, and the master X 40 issue access requests to the memory 80. The memory 80 is configured as a memory device such as a Double Data Rate-Synchronous Dynamic Random Access Memory (DDR-SDRAM). The master A 20, the master B 30, and the master X 40 are bus masters, and are configured as processors such as CPUs and Graphics Processing Units (GPUs). The master A 20, the master B 30, and the master X 40 output the access requests via corresponding buses 21, 31, and 41, respectively. The access request to the memory 80 includes an access type indicating read or write, address information of an access destination, and the like.

The master A 20 is connected to the corresponding sub-bus controller 22 via the bus 21. The sub-bus controller 22 is connected to the interconnect 60 via a bus 24. The sub-bus controller 22 includes a request issuance control unit 23. The request issuance control unit 23 receives an access request issued by the master A 20 via the bus 21, and controls an output of the received access request to the bus 24.

The master B 30 is connected to the corresponding sub-bus controller 32 via a bus 31. The sub-bus controller 32 is connected to the interconnect 60 via a bus 34. The sub-bus controller 32 includes a request issuance control unit 33. Similarly, the master X 40 is connected to the corresponding sub-bus controller 42 via a bus 41. The sub-bus controller 42 is connected to an interconnect 60 via a bus 44. The sub-bus controller 42 includes a request issuance control unit 43.

The request issuance control unit 23 receives an access request from the master A 20. When an access right is granted from the central bus controller 50, the request issuance control unit 23 outputs the access request issued by the master A 20 to the interconnect 60 via the bus 24. The request issuance control unit 23 outputs a notification signal indicating whether or not the access request has been output to the interconnect 60 to the central bus controller 50. When outputting the access request to the interconnect 60, the request issuance control unit 23 outputs a notification signal indicating that the access right has been used (right use notification), to the central bus controller 50. When the access right is granted and the access request has not been received from the corresponding master, the request issuance control unit 23 outputs a notification signal indicating that the access right is returned without using the access right (return notification), to the central bus controller 50. When the access right is not granted, the request issuance control unit 23 suppresses the output of the access request issued by the master A 20 to the interconnect 60. Functions of the request issuance control units 33 and 43 are the same as that of the request issuance control unit 23.

The interconnect 60 receives access requests issued by the master A 20, the master B 30, and the master X 40 via the buses 24, 34, and 44. The interconnect 60 is, for example, a bus arbiter, and arbitrates access requests input from a plurality of masters. The interconnect 60 outputs an access request issued by a high priority master to the memory controller 70 according to a priority set for each master, for example, when the interconnect 60 receives access requests from the master A 20, the master B 30, and the master X 40. When a response to an access request output to the memory controller 70 is obtained, the interconnect 60 selects an access request of the master having the next highest priority and outputs the access request to the memory controller 70.

The memory controller 70 is connected to the master A 20, the master B 30, and the master X 40 via a bus, the interconnect 60, and the like, and accesses the memory 80 in accordance with access requests received via the interconnect 60. Although FIG. 1 shows an example in which the electronic apparatus 10 has three masters, the number of masters is not particularly limited. The electronic apparatus 10 may have at least one master for issuing, to the memory controller 70, access requests to the memory 80. When the number of masters is one, the interconnect 60 for arbitration is unnecessary.

The memory controller 70 includes a buffer (request buffer) 71. The buffer 71 stores access requests received by the memory controller 70 via the interconnect 60. The buffer 71 has a plurality of entries, and is configured to be capable of storing a plurality of access requests. In addition to the buffer 71, the memory controller 70 includes, for example, a scheduler for selecting one of a plurality of access requests stored in the buffer 71, and a memory command generator for generating a memory command (command signal) for accessing the memory 80 in accordance with the selected access request. When an access request is selected from the buffer 71 and processed, the memory controller 70 outputs a buffer release notification indicating that the entry of the buffer 71 has been released to the central bus controller 50.

The central bus controller 50 uses the sub-bus controllers 22, 32, and 42, and performs access control for controlling an output of an access request issued by each master to the memory controller 70 through granting an access right to each master. The central bus controller 50 grants access rights to the request issuance control units 23, 33, and 43, thereby granting an access right to a master issuing an access request accepted by each request issuance control unit. The central bus controller 50, together with the sub-bus controllers 22, 32 and 42, constitutes an access controller.

The user sets, for example, a bandwidth of the respective masters in the central bus controller 50 in advance, and guarantees a Quality of Service (QOS) within a predetermined period (slot). In the present embodiment, it may be considered that a master exists for each access type, and, for example, a bandwidth may be set for each of an access request for reading (hereinafter, also referred to as a read request) and an access request for writing (hereinafter, also referred to as a write request) of the access type. The central bus controller 50 grants an access right to each of the request issuance control units 23, 33, and 43, for example, in accordance with contents of predetermined access control. The contents of the access control, for example, may be the same as those described in International Publication No. 2017/056132. The contents described in International Publication No. 2017/056132 are incorporated herein by reference.

The central bus controller 50 determines whether or not to grant access rights to the request issuance control units 23, 33, and 43 corresponding to the respective masters based on, for example, QoS information set for a read request and a write request of the respective masters. At this time, the central bus controller 50 may monitor transactions flowing through the buses by request monitors (transaction monitor signals) acquired from the buses 24, 34, and 44, and may grant access right while adjusting the granting of the access right for each slot based on the transfer amount of the transaction. The central bus controller 50 controls outputs of the read request and the write request issued by each master to the memory controller 70 through the granting of the access right.

The central bus controller 50 manages the number of grantable rights indicating the number to which access rights can be granted to masters based on a weight of 0 or more and less than 1 according to a probability (ratio) that the access right granted to each master is used, and grants the access rights within a range of the number of grantable rights. For example, each time an access right is granted to a master, the central bus controller 50 decreases the number of grantable rights by a weight corresponding to a probability that the access right is used in the master to which the access right is granted. When the central bus controller 50 receives a buffer release notification from the memory controller 70, the central bus controller 50 increases the number of grantable rights by one. The weight corresponding to the used probability is determined based on, for example, a design, a simulation result, or the like.

[Central Bus Controller]

Figure 2:
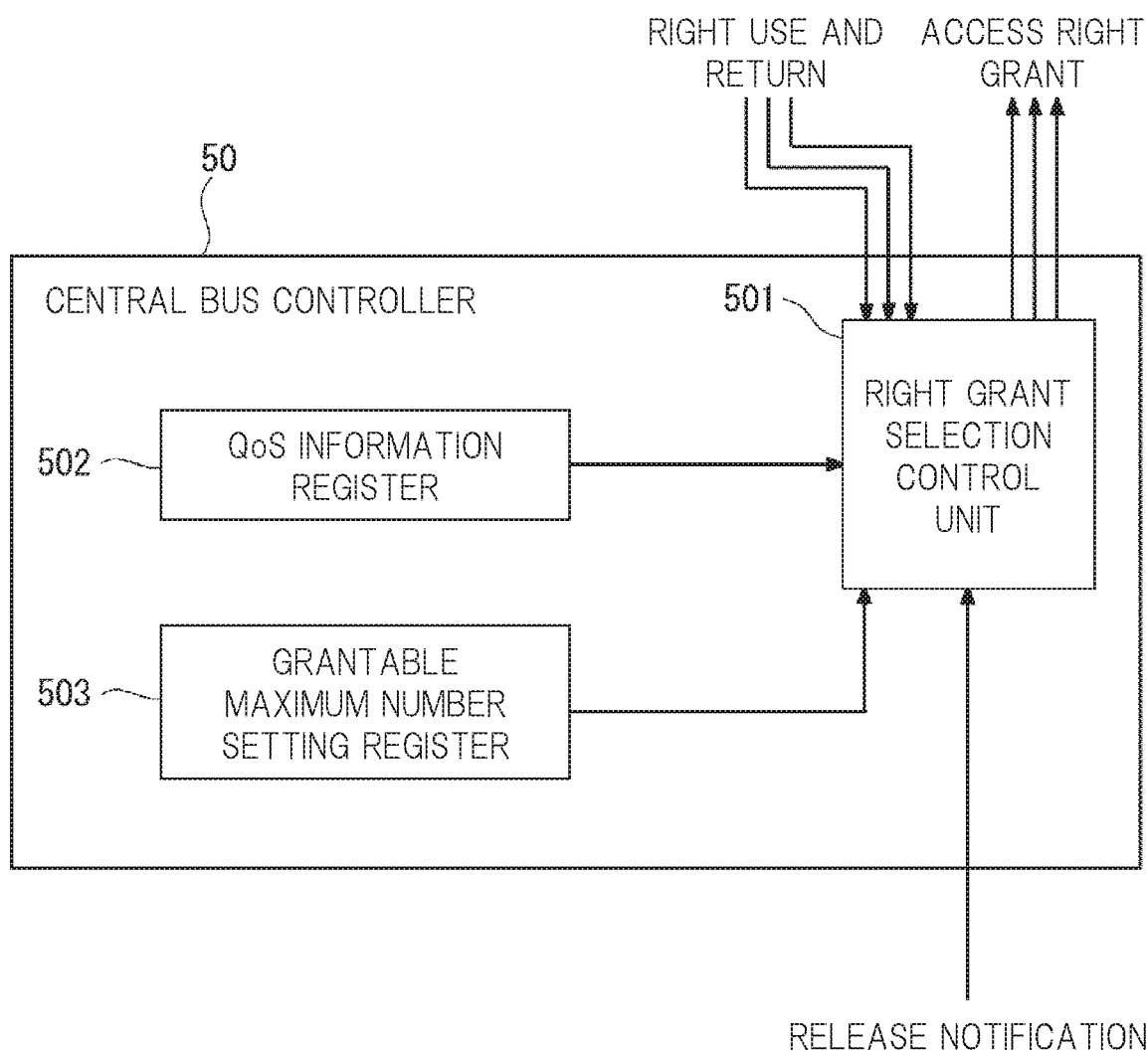
FIG. 2 is a block diagram showing an example of a configuration of a central bus controller.

FIG. 2 shows an example of a configuration of the central bus controller 50. The central bus controller 50 includes a right grant selection control unit 501, a QoS information register 502, and a grantable maximum number setting register 503. In FIG. 2, the transaction monitor signal shown in FIG. 1 is not shown.

The QoS information register 502 stores the QoS information of each master. The QoS information register 502 stores a reservation transfer amount per sub-slot of each master and a priority level of each master, for example, with a time obtained by dividing a predetermined time (slot) by a plurality of periods as a sub-slot. Alternatively, the QoS information register 502 may store a target transfer amount per sub-slot for each master.

The right grant selection control unit 501 grants access rights to the request issuance control units 23, 33, and 43 (refer to FIG. 1) The right grant selection control unit 501 determines which request issuance control unit is to be granted the access right when granting the access right. The right grant selection control unit 501 determines a request issuance control unit for granting an access right using, for example, the reservation transfer amount and the priority level read from the QoS information register 502 and the transfer amount in the sub-slot of each master. Alternatively, the right grant selection control unit 501 may determine the request issuance control unit for granting an access right using the target transfer amount read from the QoS information register 502.

The right grant selection control unit 501 outputs an access right grant signal indicating that an access right has been acquired to the request issuance control unit to which the access right is granted. For example, the right granting selection control unit 501 asserts the access right grant signal to be output to the request issuing control unit to which the access right is granted, and keeps the access right grant signal to be output to the request issuing control unit to which the access right is not granted negated. The right grant selection control unit 501 determines a master to which an access right is granted, for example, for each sub-slot.

The grantable maximum number setting register 503 stores the maximum number of grantable access rights to which the right grant selection control unit 501 can grant access rights at the same time (the maximum number of grantable rights). For example, when the rights grant selection control unit 501 outputs the same number of access requests as the maximum number of granted rights from the request issuance control unit to the interconnect 60, the maximum number of the grantable rights is set to a number at which the access requests are not congested on the bus. The rights grant selection control unit 501 calculates the number of grantable access rights with the maximum number of the grantable rights stored in the grantable maximum number setting register 503 as an upper limit, and grants the access rights within the range of the calculated number of the grantable rights.

In the present embodiment, the right grant selection control unit 501 manages the number of grantable rights based on the weight according to the probability that the access right is used in each master (access right use rate) and the maximum number of grantable rights. The right grant selection control unit 501 manages, for example, the number to which the access rights are being granted (the number of rights being granted) based on the weight according to the use rate of the access rights. The right grant selection control unit 501 manages a difference between the maximum number of grantable rights which are set in the grantable maximum number setting register 503 and the number of rights being granted, as the remaining number of grantable rights. The right grant selection control unit 501 grants the access rights within the range of the number of grantable rights.

[Right Grant Selection Control Unit]

Figure 3:
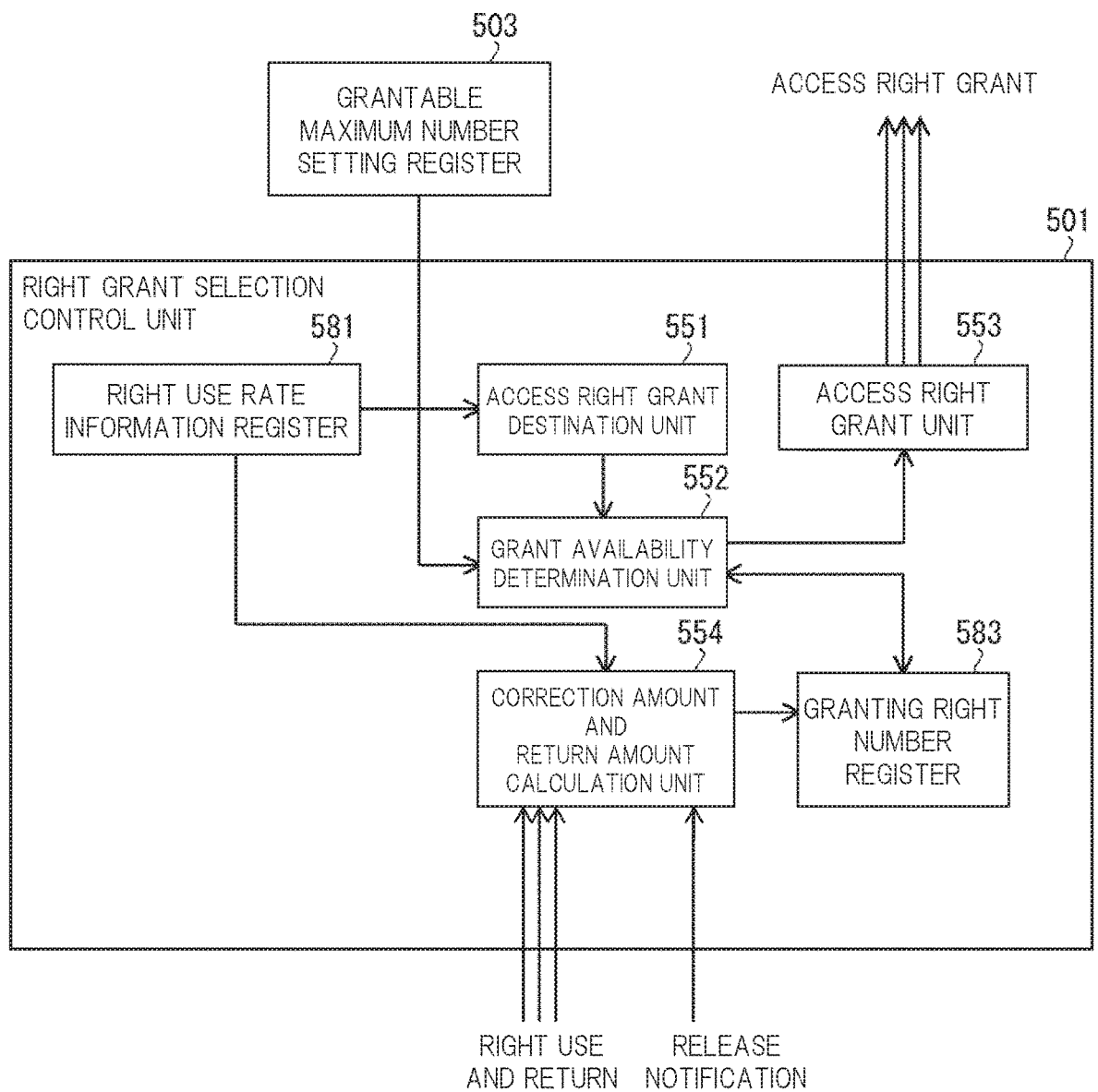
FIG. 3 is a block diagram showing an example of a configuration of a right grant selection control unit.

FIG. 3 shows an example of a configuration of the right grant selection control unit 501. The right grant selection control unit 501 includes an access right grant destination determination unit 551, a grant availability determination unit 552, an access right grant unit 553, a correction amount and return amount calculation unit 554, and a right use rate information register 581. In FIG. 3, the signal output from the QoS information register 502 of FIG. 2 is not shown.

The right use rate information register 581 stores a master and a weight corresponding to the use rate of the access right of the master in association with each other. For example, when it is assumed that the master A 20 uses the access right with a 50% probability, the right use rate information register 581 stores the master A 20 and the weight "0.5" in association with each other. For example, when it is assumed that the master B 30 uses the access right with 80% probability, the right use rate information register 581 stores the master B 30 and the weight "0.8" in association with each other. For example, when it is assumed that the master X 40 uses the access right with 100% probability, that is, the access right is not returned, the right use rate information register 581 stores the master X 40 and the weight "1" in association with each other. In the right use rate information register 581, weights for respective masters are set by using a CPU (not shown).

In the above description, the right use rate and the weight are set to the same value, but the present invention is not limited thereto. For example, if a value close to 0 is set as a weight for a master having a low right use rate, there is a possibility that the access right is excessively granted to the master and the latency is deteriorated. In such a case, a value greater than an actual right use rate, for example, 0.4, may be set as the weight.

The access right grant destination determination unit 551 determines a master to which the access right is granted. The access right graft destination determination unit 551 acquires the weight corresponding to the determined master from the right use rate information register 581, and transmits the weight to the grant availability determination unit 552. A granting right number register 583 stores the number of access rights being granted (the number of rights being granted). The grant availability determination unit 552 refers to the grantable maximum number setting register 503 and the granting right number register 583, and determines whether or not the access right can be grafted to the master determined by the access right grant destination determination unit 551 as the granted destination of the access right.

More specifically, the grant availability determination unit 552 calculates the difference (the number of grantable rights) between the maximum number of grantable rights stored in the grantable maximum number setting register 503 and the number of rights being granted stored in the granting right number register 583. The grant availability determination unit 552 compares the calculated number of grantable rights with the weight which is received from the access right grant destination determination unit 551 and which is corresponding to the access right use rate of the master determined as the granted destination of the access right. The grant availability determination unit 552 determines that the access right can be granted if the number of grantable rights is equal to or greater than the weight received from the access right grant destination determination unit 551. The grant availability determination unit 552 determines that the access right cannot be granted if the number of grantable rights is smaller than the weight received from the access right grant destination determination unit 551.

When determining that the access right can be granted, the grant availability determination unit 552 instructs the access right grant unit 553 to grant the access right to the master determined by the access right grant destination determination unit 551. In addition, the grant availability determination unit 552 adds the weight received from the access right grant destination determination unit 551 to the number of rights being granted stored in the granting right number register 583, thereby consuming the number of rights being granted by the weight. Every time the access right is granted to the master, the grant availability determination unit 552 adds a weight corresponding to the access right use rate of the master to which the access right is granted to the number of rights being granted.

In the present embodiment, the number of rights being granted is weighted by a weight corresponding to the access right use rate. For example, when the number of granted access rights is "10", if all weights corresponding to the use rate of the access rights of the master to which the access rights are granted are "0.5", the number of rights being granted is 10×0.5=5. If the number granted access rights is "10" and all weights corresponding to the use rate of the access rights of the master to which the access rights are granted are "1", the number of rights being granted is 10×1=10.

In the present embodiment, the number of grantable rights which is represented by the difference between the maximum number of grantable rights and the number of rights being granted changes according to the access right use rate, and when an access right is granted to a master with a low access right use rate, the number of grantable rights increases as compared with a case where an access right is granted to a master with a high access right use rate. In other words, when the access right is granted to a master having a high return rate of the access right, the access right is consumed more than when the access right is granted to a master having a low return rate of the access right.

When the access right is granted from the access right grant unit 553 and the access request received from the corresponding master, the request issuance control units 23, and 43 output the access request to the interconnect 60 using the granted access right. At this time, the request issuance control unit outputs the right use notification to the central bus controller 50. In the central bus controller 50 the correction amount and return amount calculation unit 554 of the right grant selection control unit 501, when receiving the right use notification, corrects the calculated number of rights being granted using the weight stored in the right use rate information register 581 at the time of granting the access right. The correction amount and return amount calculation unit 554 corrects the number of rights being granted based on, for example, a difference between the weight stored in the right use rate information register 581 and which is corresponding to the access right use rate of the master and "1".

More specifically, for example, in a case where the master A 20 is the granted destination of the access right, the grant availability determination unit 552 adds the weight "0.5" stored in the right use rate information register 581 to the number of rights being granted at the time of granting the access right. When the right use notification is received, the correction amount and return amount calculation unit 554 corrects the number of rights being granted by a difference between the weights "0.5" stored in the right use rate information register 581 and "1". In this case, the number of rights being granted is increased by the weight difference "0.5", and one access right is consumed.

On the other hand, when the access right is granted from the access right grant unit 553 and the access request is not received from the corresponding master, the request issuance control units 23, 33, and 43 return the access right to the central bus controller 50 without using the granted access right. In the central bus controller 50, when the access right is returned, the correction amount and return amount calculation unit 554 of the right grant selection control unit 501 subtracts the weight stored in the right use rate information register 581 from the number of rights being granted to which the weight stored in the right use rate information register 581 is added at the time of granting the access right. Thus, when the access right is returned, the number of rights being granted is returned to the state before the grant of the access right, and the number of grantable rights can be increased by that amount. The returned access right can be used for the access right to other masters.

When a memory access based on the access request stored in the buffer 71 is processed and the entry of the buffer 71 is released, the memory controller 70 outputs a release notification signal to the central bus controller 50. In the central bus controller 50, when the correction amount and return amount calculation unit 554 receives the release notification signal, the number of rights being granted stored in the granting right number register 583 is decreased by one. Thus, it is possible to grant the access right used in the access request for which processing has been completed to another access request.

[Operation Steps]

Figure 4:
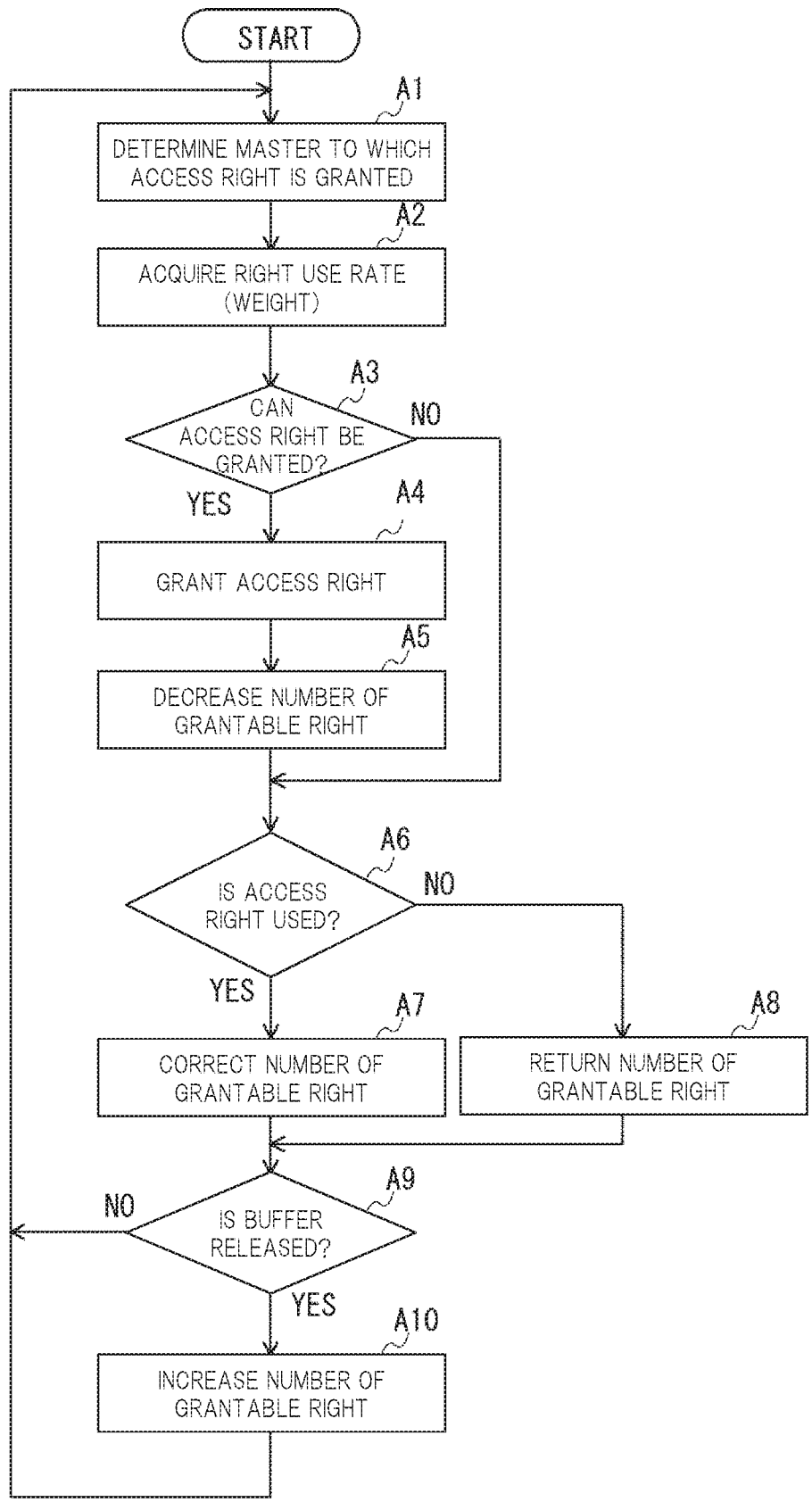
FIG. 4 is a flowchart showing operation steps of a part related to a management of the number of grantable rights.

Next, operation steps will be described. FIG. 4 shows operation steps of a part related to management of the number of grantable rights. Prior to an operation of the electronic apparatus 10, necessary information is set in the right use rate information register 581 (refer to FIG. 3). In the right use rate information register 581, a weight corresponding to the access right use rate predicted (estimated) by each master is set for each master. The weight set in the right use rate information register 581 indicates the number of access rights consumed by the access requests of each master.

The access right grant destination determination unit 551 determines a master (request issuance control unit) to which the access right is granted (step A1). The access right grant destination determination unit 551 acquires a weight corresponding to the master to which the access right is granted and which is determined by step A1 (step A2). The access right grant destination determination unit 551 transmits the acquired weight to the grant availability determination unit 552.

The grant availability determination unit 552 determines whether or not the access right can be granted to the master determined in step A1 based on the weight received from the access right grant destination determination unit 551, the maximum number of grantable rights stored in the grantable maximum number setting register 503, and the number of rights being granted stored in the grating right number register 583 (step A3). In step A3, for example, the grant availability determination unit 552 determines whether or not the number of grantable rights obtained by subtracting the number of rights being granted from the maximum number of grantable rights is equal to or greater than the weight received from the access right grant destination determination unit 551. When the number of grantable rights is equal to or greater than the weight received from the access right grant destination determination unit 551, the grant availability determination unit 552 determines that the access right can be granted. When the number of grantable rights is smaller than the weight received from the access right grant destination determination unit 551, the grant availability determination unit 552 determines that the access right cannot be granted.

When determining that the access right can be granted in step A3, the grant availability determination unit 552 instructs the access right grant unit 553 to grant the access right. The access right grant unit 553 grants the access right to the master determined in step A1 when the grafting of the access right is instructed from the grant availability determination unit 552 (step A4). When the access right is granted to the master determined in step A1, the grant availability determination unit 552 decreases the number of grantable access rights by the weight received from the access right grant destination determination unit 551 (step A5). In other words, the grant availability determination unit 552 consumes the number of grantable rights by the weight received from the access right grant destination determination unit 551. In step A5, for example, the grant availability determination unit 552 adds the weight received from the access right grant destination determination unit 551 to the number of rights being granted stored in the granting right number register 583, thereby decreasing the number of grantable rights. If it is determined in step A3 that the number of grantable rights is smaller than the weight received from the access right grant destination determination unit 551, the granting of the access right is suspended. When the number of grantable rights changes and the number of grantable rights becomes equal to or greater than the weight received from the access right grant destination determination unit 551, the access right is granted.

The master outputs the access request to the request issuance control unit of the corresponding sub-bus controller. When the access right is granted and the access request is received from the master, the request issuance control unit outputs the access request to the interconnect 60. At this time, the request issuance control unit transmits the right use notification to the central bus controller 50. When the access right is granted and the access request is not received from the master, the request issuance control unit transmits the return notification to the central bus controller 50, and returns the granted access right to the central bus controller 50.

The correction amount and return amount calculation unit 554 determines whether or not the access right is used in the request issuance control unit corresponding to the master to which the access right is granted (step A6). That is, the correction amount and return amount calculation unit 554 determines whether the right use notification or the return notification has been received from the request issuance control unit. When the right use notification is received, the correction amount and return amount calculation unit 554 corrects the reduced number of grantable rights in step A5 (step A7). In step A7, the correction amount and return amount calculation unit 554 calculates a difference between the weight acquired in step A2 and "1". The correction amount and return amount calculation unit 554 increases the number of rights being granted stored in the granting right number register 583 by the calculated difference, thereby correcting the number of rights consumed by the weight corresponding to the right use rate at the time of granting the right to "1". If the calculated difference is 0, the number of grantable rights is not corrected.

The correction amount and return amount calculation unit 554 returns the reduced number of grantable rights in Step A5 when the return notification is received (step A8). In step A8, the correction amount and return amount calculation unit 554 decreases the number of rights being granted stored in the granting right number register 583 by the weight acquired in step A2, thereby increasing the number of grantable rights by the weight acquired in step A2.

The access request output from the request issuance control unit is arbitrated by the interconnect 60 and stored in the buffer 71 of the memory controller 70. The memory controller 70 performs memory access to the memory 80 in accordance with the access request stored in the buffer 71. When the memory access based on the access request is completed, the memory controller 70 releases the entry of the buffer 71. At this time, the memory controller 70 transmits the release notification signal to the central bus controller 50.

The correction amount and return amount calculation unit 554 determines whether the release notification signal has been received from the memory controller 70 (step A9). The correction amount and return amount calculation unit 554 increases the number of grantable rights by one when determining that the release notification signal has been received (step A10). In step A10, the correction amount and return amount calculation unit 554 decreases the number of rights being granted stored in the granting right number register 583 by one, thereby increasing the number of grantable rights by one.

[Operation Example]

Figure 5:
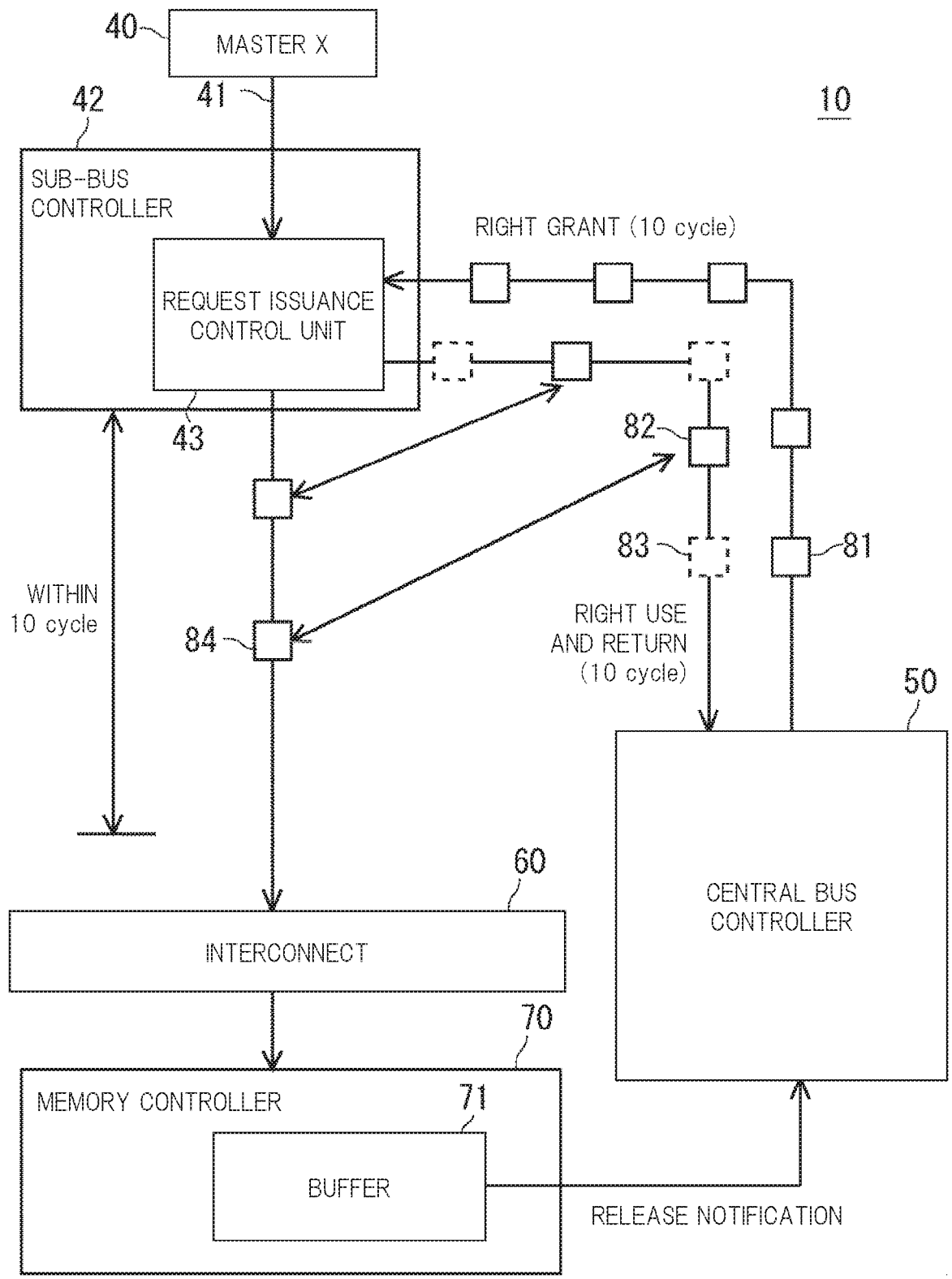
FIG. 5 is a Block diagram showing the electronic apparatus in one aspect.

FIG. 5 shows the electronic apparatus 10 in one aspect. In FIG. 5, for simplification of description, the master A 20 and the master B 30, and the sub-bus controllers 22 and 32 and the like associated therewith are omitted. In FIG. 5, it is assumed that the access right granted by the central bus controller 50 reaches the request issuance control unit 43 of the sub-bus controller 42 ten cycles after the output of the access right. It is also assumed that the right use notification and the return notification output from the request issuance control unit 43 reach the central bus controller 50 ten cycles after the output of the right use notification and the return notification.

In FIG. 5, it is assumed that the central bus controller 50 grants one access right every two cycles. Assume that the use rate of the access right in the master X 40 (request issuance control unit 43) is 50%, and the right use rate information register 581 (refer to FIG. 3) stores the master X 40 and the weight "0.5" in association with each other. In FIG. 5, the access rights 81 sequentially output from the central bus controller 50 every two cycles reach the request issuing control unit 43 ten cycles after the respective outputs of the access rights. In the present embodiment, the number of grantable rights is managed in consideration of how much access right is used among the granted access rights and how much access request enters a route from the request issuance control unit 43 to the interconnect 60.

If the access right is not received from the master X 40 when the first access right is granted, the request issuance control unit 43 outputs the return notification 83 to the central bus controller 50. The return notification 83 reaches the central bus controller 50 after ten cycles. If the access right is received from the master X 40 when the second access right is granted, the request issuance control unit 43 uses the access right and outputs the access request 84 to the interconnect 60. Further, the request issuance control unit 43 outputs the right use notification 82 corresponding to the output access request 84 to the central bus controller 50. The right use notification 82 reaches the central bus controller 50 after ten cycles.

For example, it is assumed that the maximum number of grantable rights is equal to the number of entries in the buffer 71, and the number of empty entries in the buffer 71 and the number of grantable rights are "1". In International Publication No. 2017/056132, since the number of grantable rights is consumed by one every time the access right is granted, the number of grantable rights becomes "0" when the access right 81 is granted to the master X 40, and the granting of the access right is stopped. When the master X 40 has not issued the access request, the request issuance control unit 43 outputs the return notification 83 to the central bus controller 50. The return notification 83 reaches the central bus controller 50 twenty cycles after the grant of the access right 81. In this case, the central bus controller 50 cannot grant a new access right for twenty cycles.

In contrast to the above, in the present embodiment, when the access right is granted to the master X 40, the number of grantable rights is consumed by "0.5". In this case, since the number of grantable rights remains "0.5", the central bus controller 50 can grant another access right to the master X 40 in succession. Since the right use rate of the master X 40 is 50%, it is highly likely that one of the two granted access rights is used and the other is returned. The central bus controller 50 restores the number of rights to be consumed from "0.5" to "0" when the return notification 83 is received, and changes the number of rights to be consumed from "0.5" to "1" when the right use notification 82 is received. In this case, the number of rights consumed is subtracted to "1", and the granting of the access right is stopped until the buffer 71 is released.

[Conclusion]

In the present embodiment, the number of grantable rights is managed in accordance with a rate at which the master uses the access right. For example, a master having a high right use rate sets a greater number of rights consumed per access right than a master having a low right use rate. In this case, it is possible to speculatively grant the access right to the master having the low right use rate in anticipation of the return of the access right. On the other hand, for the master having the high right use rate, it is possible to suppress the granting of an excessive access right. Thus, it is possible to suppress the excessive granting of the access right and the shortage of the number of grants, prevent the deterioration of the latency and the decrease of the memory efficiency, eliminate the congestion of requests on the bus under various conditions, and improve the memory efficiency.

In comparison with International Publication No. 2017/056132, in international Publication No. 2017/056132, when the upper limit of the number of granted access rights (maximum number of grantable access rights) is set to be greater than the number of entries of the buffer in the memory controller, access rights can be granted speculatively to some extent, and access rights that may be returned can be effectively used. However, in this case, when the maximum number of grantable rights is set to a small number in accordance with a master having a high right use rate, that is, a master continuously issuing a request, the number of access rights received by the memory controller decreases in a state in which a large number of masters having a low right use rate operate, and the memory efficiency deteriorates. Conversely, when the maximum number of grantable rights is set to a great number in accordance with a master having a low right use rate, that is, a master intermittently issuing a request, the access requests are congested on the bus in a state in which a large number of masters having a high right use rate operate, and latency deteriorates. In the present embodiment, since the number of rights is consumed by die weight corresponding to the right use rate at the time of granting the access right, the memory efficiency and the low latency can be compatible in various situations.

Second Embodiment

Figure 6:
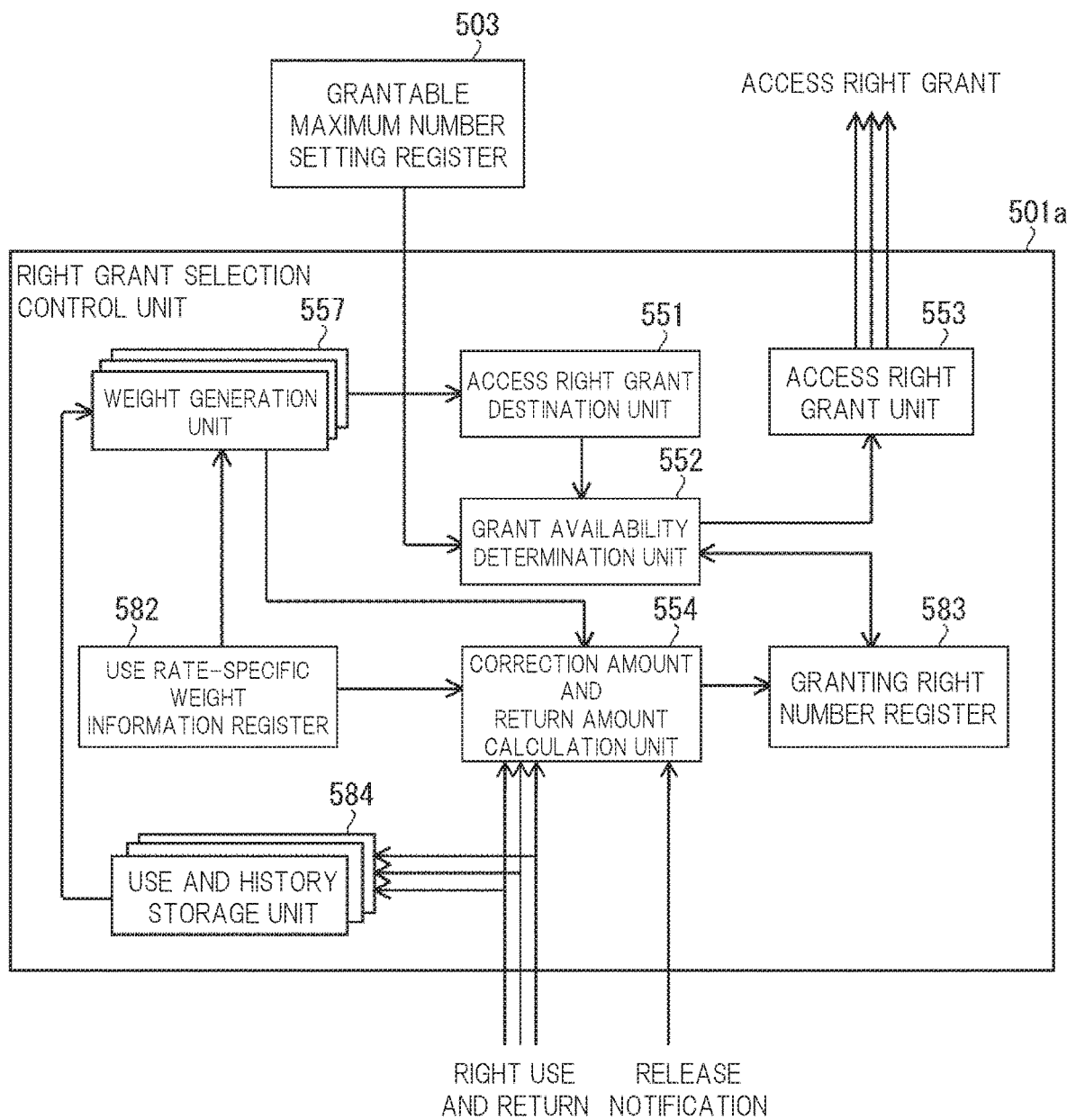
FIG. 6 is a Block diagram showing an example of a configuration of a right grant selection control unit used in an electronic apparatus according to a second embodiment.

Next, a second embodiment will be described. FIG. 6 shows an example of a configuration of a right grant selection control unit used in an electronic apparatus according to the second embodiment. In the present embodiment, the configuration of the electronic apparatus may be the same as that of the electronic apparatus 10 shown in FIG. 1. A configuration of a central bus controller may be the same as that of the central bus controller 50 shown in FIG. 2. The right grant selection control unit 501a used in the present embodiment has a configuration in which a use rate-specific weight information register 582 and a use and return history storage unit 584 are added to the configuration of the right grant selection control unit 501 used in the first embodiment shown in FIG. 3. The right use rate information register 581 in the right grant selection control unit 501 is replaced with a weight generation unit 557. Other points may be the same as those in the first embodiment.

The use and return history storage unit 584 stores the right use notification and the return notification notified from the request issuance control unit. The weight generation unit 557 refers to the use and return history storage unit 584, estimates a right use rate of the master based on a use and return history of the access right stored in the use and return history storage unit 584, and generates a weight corresponding to the estimated right use rate. The use rate-specific weight information register 582 stores the right use rate of the access right and the weight in association with each other. The weight generation unit 557 acquires the weight corresponding to the estimated right use rate from the use rate-specific weight information register 582, and outputs the acquired weight to the access right grant destination determination unit 551, the correction amount and return amount calculation unit 554, and the like.

The weight generation unit 557 and the use and return history storage unit 584 are arranged, for example, corresponding to each of a plurality of masters included in the electronic apparatus 10. The use and return history storage unit 584 corresponding to each master stores the history of the right use notification and the return notification notified from the request issuance control unit corresponding to each master. The weight generation unit 557 corresponding to each master refers to the use and return history storage unit 584 corresponding to each master, and generates the weight corresponding to the right use rate of each master.

The request issuance control units 23, 33, and 43 (refer to FIG. 1) output rights use notifications to the central bus controller 50 when outputting access requests issued by the master A 20, the master B 30, and the master X 40, respectively, to the interconnect 60. When the access request has not been received, the request issuance control units 23, 33, and 43 notify the return notification to the central bus controller 50. The use and return history storage unit 584 stores, for example, a predetermined number of rights use notifications and return notifications for each master.

The weight generation unit 557 calculates an average use rate of the access right in the master based on, for example, the number of right use notifications or the number of return notifications stored in the use and return history storage unit 584 and the number of access rights granted by the access right grant unit 553. In the weight generation unit 557, a time for counting the number of granted access rights and a time for counting the number of uses or the number of returns may be configured to be changeable by register setting. The weight generation unit 557 sets, for example, an average of several right use rates in the past as the average use rate. At this time, the weight generating unit 557 may increase the weight of the right use rate in the latest, and calculate a weighted average of the right use rates. A calculation method of the average use rate in the weight generation unit 557 may be configured to be switchable by using, for example, a register (not shown).

The weight generation unit 557 acquires a weight correspond to the calculated average use rate from the use rate-specific weight information register 582. In the weight generation unit 557, for example, a weight similar to that set in the right use rate information register 581 (refer to FIG. 3) may be set as an initial value. When determining the master to which the access right is granted, the access right grant destination determination unit 551 acquires, from the weight generation unit 557, the weight corresponding to the right use rate of the master to which the access right is granted. At the time of granting the access right, the grant availability determination unit 552 updates the number of rights being granted stored in the granting right number register 583 using the weight acquired from the weight generation unit 557.

When the right use notification is received from the request issuance control unit to which the access right is granted, the correction amount and return amount calculation unit 554 corrects the number of rights being granted stored in the granting right number register 583 based on the difference between the weight added to the granting right number register 583 at the time of granting the access right and "1". When the return notification is received from the request issuance control unit to which the access right is granted, the correction amount and return amount calculation unit 554 subtracts the weight added to the granting right number register 583 at the time of granting the access right from the number of rights being granted stored in the granting right number register 583.

Here, there is a predetermined time difference between a timing at which the right grant selection control unit 501a grants the access right to the request issuance control unit and a timing at which the right use notification or the return notification is received from the request issuance control unit. In order to adjust the time difference, the correction and return amount calculation unit 554 may receive the weight generated by the weight generation unit 557 via such as First In First Out (FIFO) for delaying data by a predetermined time. In this case, even if the weight generated by the weight generation unit 557 changes between the grant of the access right and the reception of the right use notification or the return notification, the correction amount and return amount calculation unit 554 can correct the number of rights being granted using the weight used at the time of granting the access right, or increase the number of rights being granted by the weight used at the time of granting the access right.

[Conclusion]

In the present embodiment, the weight generation unit 557 estimates the use rate of the access right of the master based on the actual use situation of the access right, and generates the weight at the time of granting the access right. By using the history of the use situation of the access right, it is possible to more accurately estimate how much the access right is used and how much the access right is returned by the master, and by using the weight corresponding to the estimated right use rate, it is possible to prevent deterioration of latency and deterioration of memory efficiency.

Third Embodiment

Figure 7:
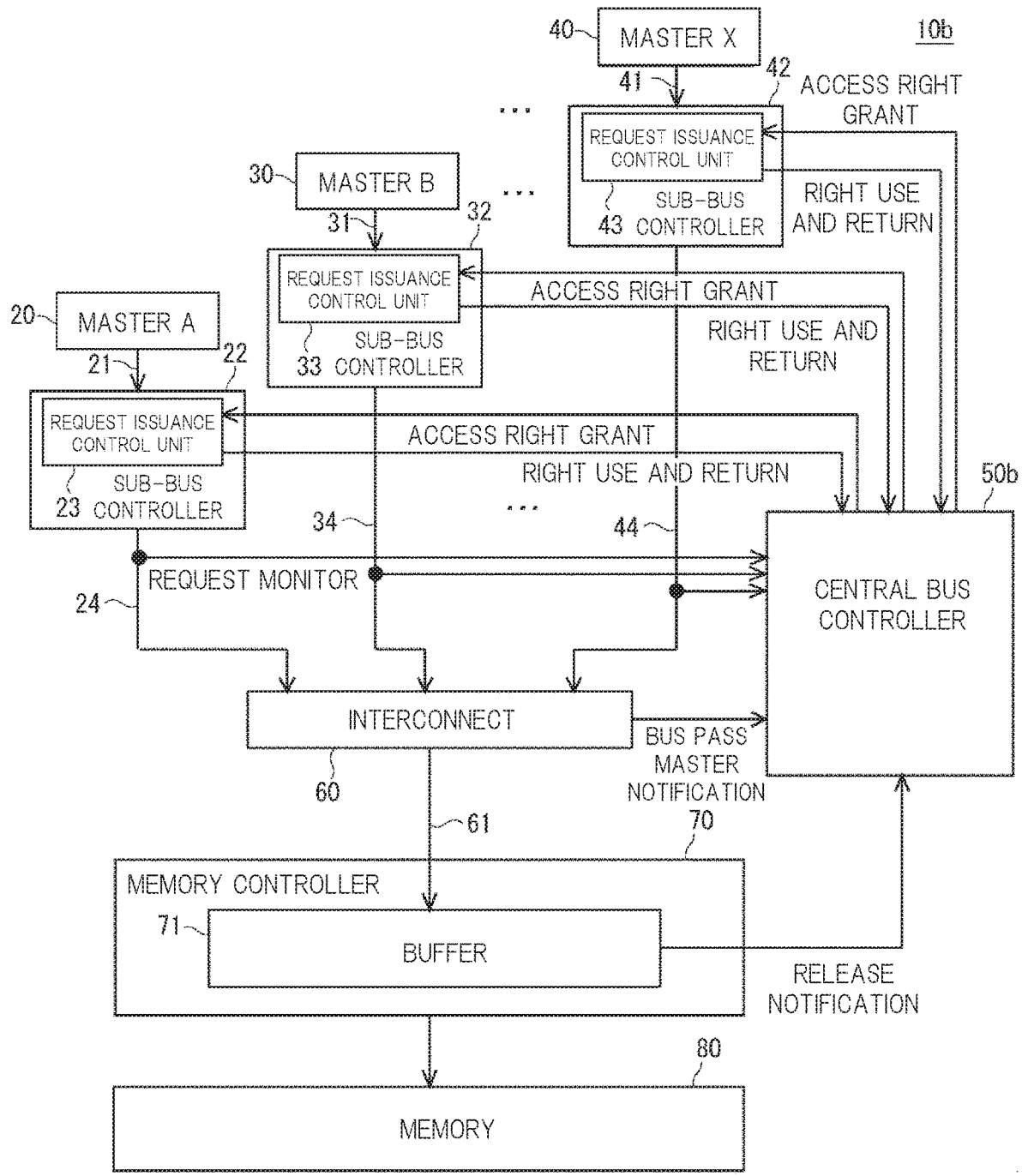
FIG. 7 is a Block diagram showing an electronic apparatus including a semiconductor device according to a third embodiment.

Next, a third embodiment will be described. FIG. 7 shows an electronic apparatus including a semiconductor device according to the third embodiment. The electronic apparatus 10b according to the present embodiment differs from the electronic apparatus 10 according to the first embodiment shown in FIG. 1 in that the interconnect 60 outputs a bus pass master notification to a central bus controller 50b. In the present embodiment, the central bus controller 50b determines whether or not the access requests are congested on the bus using the bus pass master notification. Other points may be the same as in the first embodiment or the second embodiment.

When the granted access right is returned from the request issuance control unit, it takes several cycles until the return notification is received by the central bus controller 50b. Therefore, until receiving the return notification, the central bus controller 50b cannot know whether or not the access right is used and whether or not the access request is passed through the request issuance control unit. In the present embodiment, the interconnect 60 arranged immediately before the memory controller 70 outputs, for example, an AxID signal indicating an ID of die master issuing access requests to be selected, as the bus pass master notification. By referring to the AxID signal, the central bus controller 50b can determine which master the access request stored in the buffer 71 comes from. In the present embodiment, the central bus controller 50b determines which master access request is stored in the buffer 71 of the memory controller 70, calculates the number of requests being congested on the bus, and determines die congestion of the bus.

Figure 8:
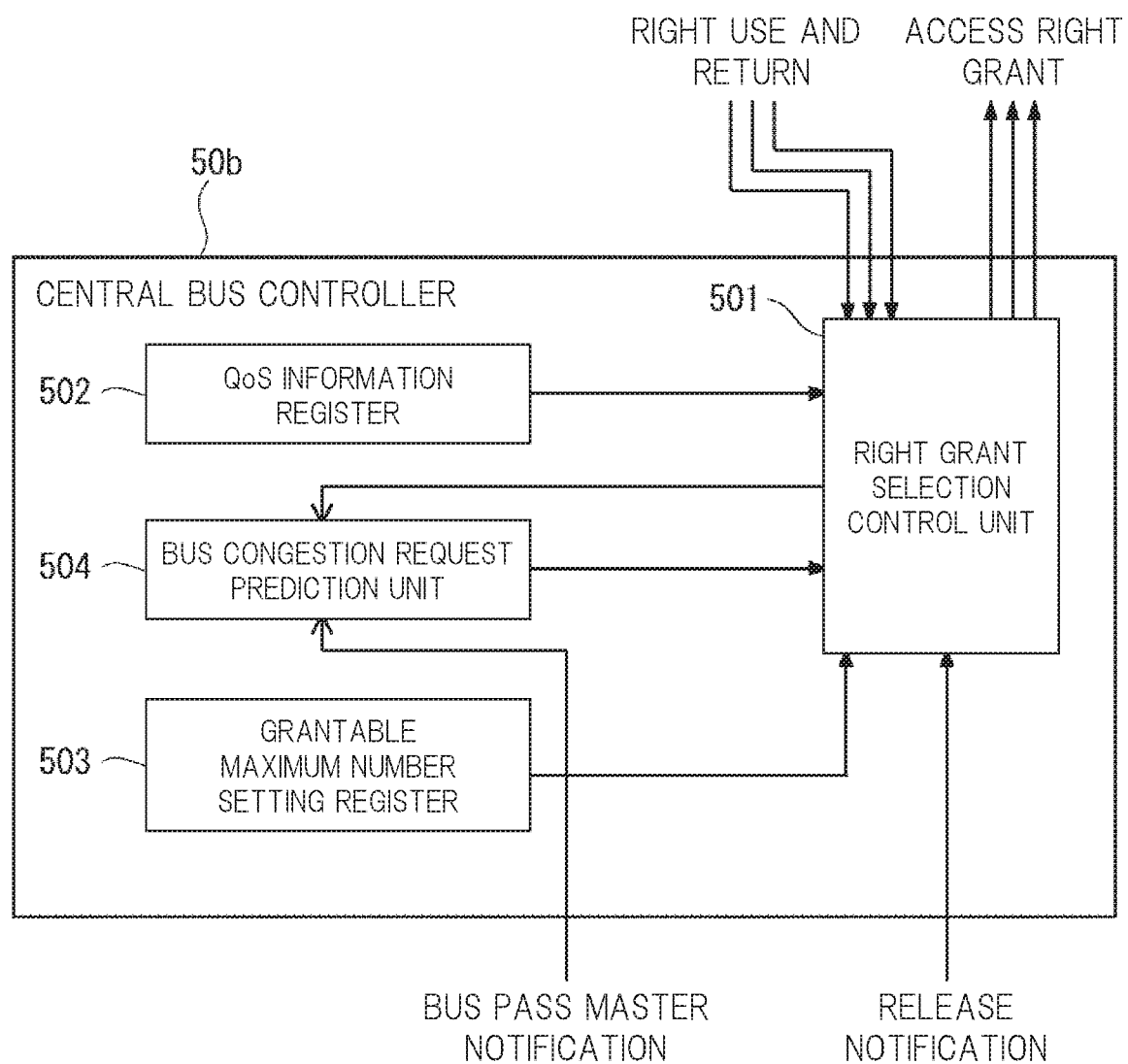
FIG. 8 is a Block diagram showing a configuration of a central bus controller used in the third embodiment.

FIG. 8 shows a configuration of the central bus controller 50b used in the present embodiment. The central bus controller 50b includes a bus congestion request prediction unit 504 in addition to the configuration of the central bus controller 50 used in the first embodiment shown in FIG. 2. The bus congestion request prediction unit 504 receives the bus pass master notification from the interconnect 60. The bus congestion request prediction unit 504 acquires, from the right grant selection control unit 501, information on the master to which the access right is granted, the master that uses or returns the access right, the right use rate of the master, and the like. The bus congestion request prediction unit 504 predicts the access request being congested on the bus based on, for example, the number of granted access rights, the number of used access rights, the right usage rate, and the bus pass master notification.

When the number of access requests being congested on the bus is equal to or greater than a predetermined threshold value, the bus congestion request prediction unit 504 determines that the bus is congested. In this case, the bus congestion request prediction unit 504 notifies the right grant selection control unit 501 of information identifying the congested bus when receiving the information identifying the congested bus from the bus congestion request prediction unit, the right grant selection control unit 501 stops granting an access right to a master connected to the bus. The right grant selection control unit 501 may refer to the QoS information register 502 and stop granting an access right to a master having a low QoS priority among masters connected to the congested bus. By stopping the granting of the access right to the master connected to the congested bus, it is possible to suppress the deterioration of the latency. In addition, it is possible to grant the access right not granted to the master connected to the congested bus to a master connected to a bus which is not congested, and the memory efficiency can be improved by effectively utilizing the access right.

[Operation Example]

Figure 9:
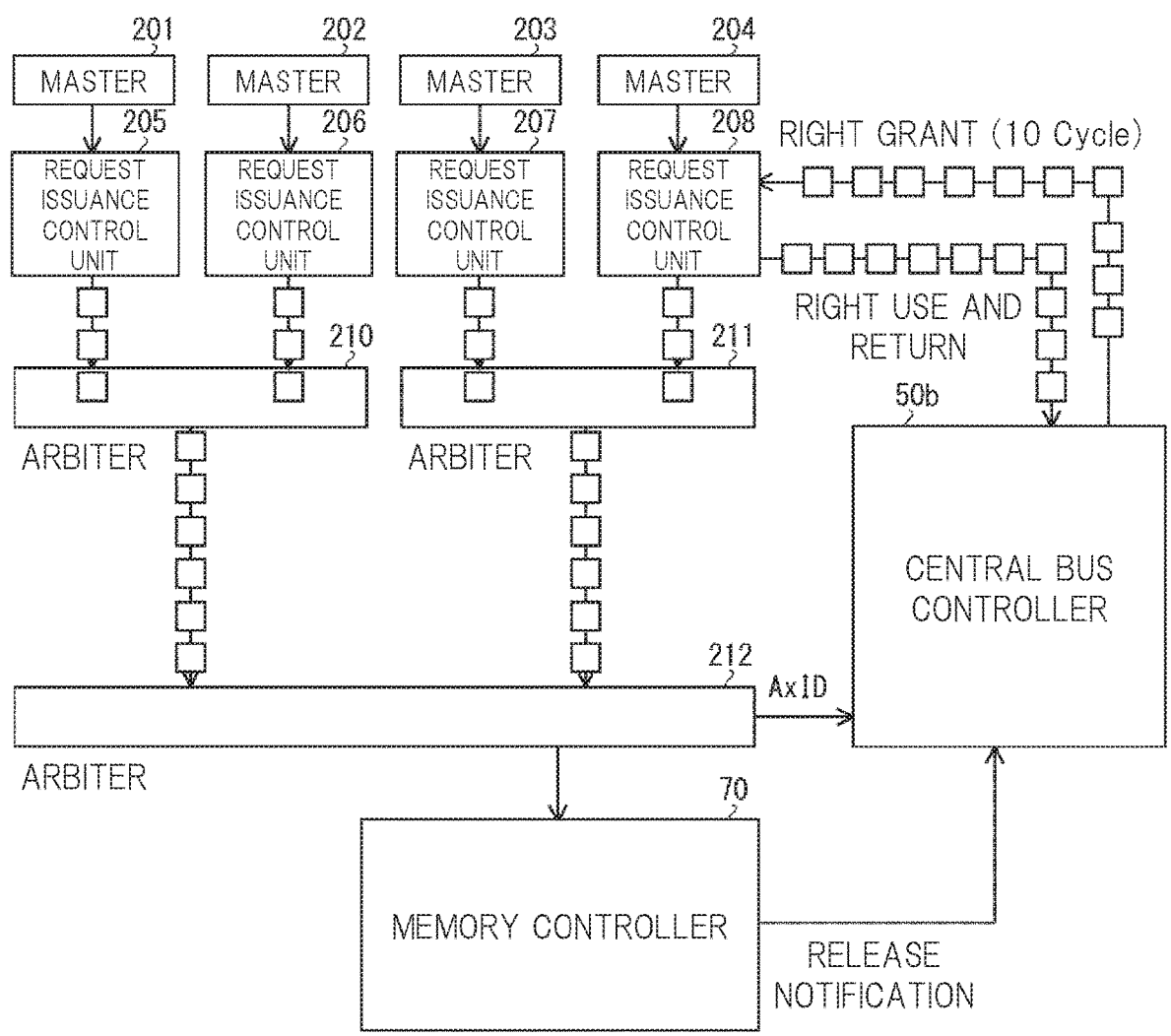
FIG. 9 is a Block diagram showing a portion of the electronic apparatus in one aspect.

FIG. 9 shows a portion of an electronic apparatus in an aspect. Here, an example is considered in which the electronic apparatus 10b has four masters 201 to 204. The masters 201 to 204 are connected to request issuance control units 205 to 208, respectively. The request issuance control units 205 and 206 output access requests to an arbiter 210, and the request issuance control units 207 and 208 output access requests to an arbiter 211.

The arbiter 210 arbitrates between the access request issued by the master 201 and the access request issued by the master 202. The arbiter 211 arbitrates between the access request issued by the master 203 and the access request issued by the master 204. An arbiter 212 arbitrates between the access request passed through the arbiter 210 and the access request passed through the arbiter 211. The arbiters 210 and 211 correspond to interconnect 60 shown in FIG. 1 and the like. In this example, the arbiter 212 arranged immediately before the memory controller 70 as viewed from the masters outputs the AxID signal (bus pass master notification) to the central bus controller 50b.

In FIG. 9, it is assumed that a time required for the access right output from the central bus controller 50b to reach the request issuance control units 205 to 208 corresponding to the masters 201 to 204 is ten cycles, it is assumed that a time required for the right use notification or the return notification output from the request issuance control units 205 to 208 to reach the central bus controller 50b is ten cycles. Further, it is assumed that a time required for the access request (transaction) that is passed through the request issuance control units 205 to 208 to reach the arbiter 212 of the final stage is ten cycles at the shortest, that is, in a state where the bus is not congested.

In FIG. 9, it is assumed that it takes one cycle for the access right and the access request to pass through one square shown on a path. In FIG. 9, for the sake of simplicity, only the paths between the request issuance control unit 208 and the central bus controller 50b for granting the access right and for transmitting the right use notification or the return notification are shown, but the paths between the request issuance control units 205 to 207 and the central bus controller 50b for granting the access right and for transmitting the right use notification or the return notification exist in the same manner.

In FIG. 9, it is assumed that the right use rate of the masters 201 and 202 is 0.5, and the central bus controller 50b grants one access right to each of the masters 201 and 202 in each cycle (two rights per cycle). In that case, the use rate on the paths from the masters 201 and 202 to the arbiter 210 would be about half, and the path from the arbiter 210 to the arbiter 212 would not be just barely congested. In this case, if the right use rate of any master exceeds 0.5, the congestion on the bus occurs, and the access right granted to the request issuance control units 205 and 206 is returned at a constant rate.

As an extreme case, when the right use rate of both masters is 1, the return of the access right occurs when the access right is granted to two masters for four consecutive cycles. From a viewpoint of efficiently utilizing the access right, unnecessary granting of the access right should be avoided. The central bus controller 50b may limit the granting of the access right so that a total of a product of the number of granted access rights and the right use rate within a certain period of time becomes equal to or less than a certain value. For example, when the total of the product of the number of granted access rights and the right use rate within a certain period of time exceeds 1.2, the granting of access rights may be stopped.

Alternatively, scheduling performed the memory controller 70 may cause access requests to become congested at the arbiter 212. For example, when the right use rate of the master 201 is 0.5 and only the master 201 is operating, the above-mentioned congestion of the access request does not occur. However, if the memory controller 70 does not accept the access request for any reason, the congestion of the access requests occur on the bus. When about ten cycles have elapsed since the access request is unable to pass through the arbiter 212, the congestion of the access request is propagated to the master 201, and the access right is returned from the request issuance control unit 205. The congestion can be determined by monitoring a transaction ID (which master transaction) at the arbiter 212.

As a countermeasure to the above, the central bus controller 50b calculates a value obtained by adding a product of the number of granted access rights and the value of the right use rate to the total number of access requests that have not passed at a timing to pass through the arbiter 212. If the calculated value is equal to or greater than a predetermined value, the central bus controller 50b may stop granting the access right to the master. The timing at which the access request should pass through the arbiter 212 can be estimated based on a time required for the granted access right to reach the request issuance control unit and a time required for the access request output from the request issuance control unit to reach the arbiter 212. For example, if it is possible to pass through the arbiter 212 in twenty cycles from the grant of access rights, the central bus controller 50b may suspend the grant of access rights to the master if the calculated value is 15 or more. In the example of FIG. 9, since the path from the arbiter 210 to the arbiter 212 is common to the master 201 and the master 202, six cycles are required to be calculated together with the master 202. As an exception to the above, the central bus controller 50b does not stop the granting of the access right to a master having a high priority with a severe latency constraint even when the above condition is satisfied.

[Conclusion]

In the present embodiment, the central bus controller 50b receives the bus pass master notification from the interconnect 60. The central bus controller 50b knows which master has output the access request to the memory controller 70, and can predict the congestion of the access request on the bus from the number of granted access rights, the number of returns, the right use rate, and the like. When the access request is congested on the bus, the central bus controller 50b stops granting the access right to the master connected to the bus. In such a case, it is possible to suppress the deterioration of the congestion of the access right. Further, it is possible to grant the access right to the master connected to the bus on which the access right is not congested, and it is possible to make effective use of the access right.

Fourth Embodiment

Figure 10:
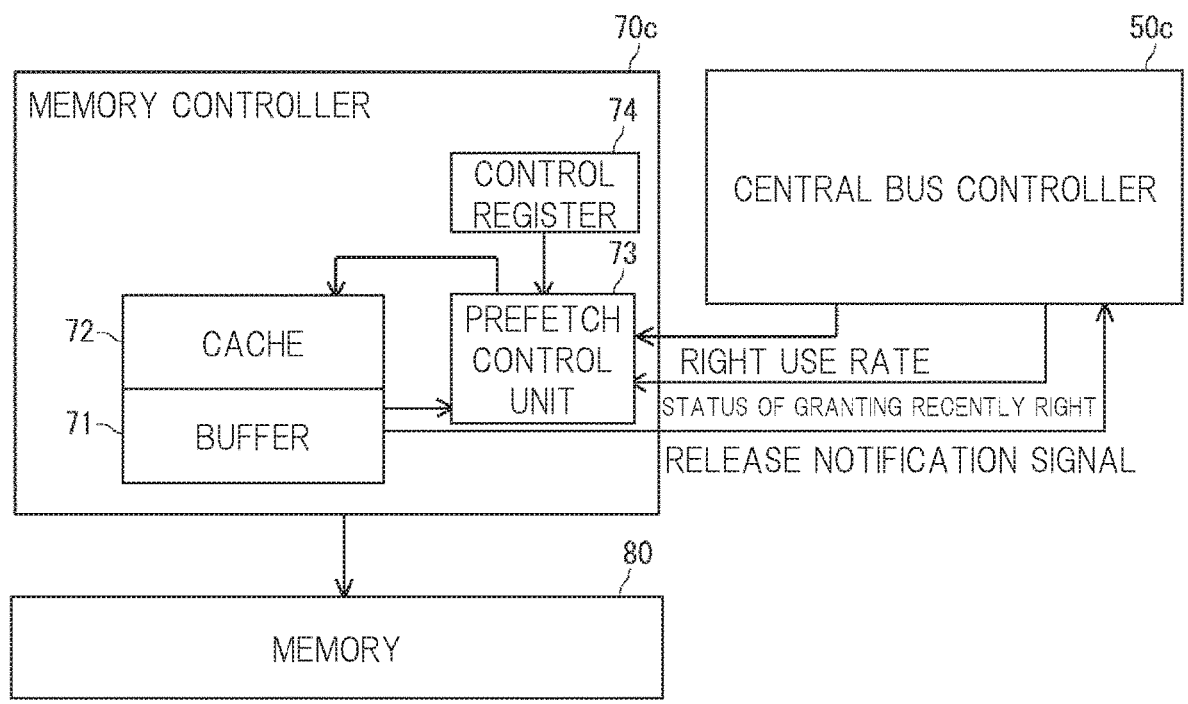
FIG. 10 is a memory controller used in an electronic apparatus according to a fourth embodiment.

Next, a fourth embodiment will be described. FIG. 10 shows a memory controller used in the electronic apparatus according to the fourth embodiment. In the present embodiment, a configuration of the electronic apparatus may be the same as that shown in FIG. 1. A configuration of a central bus controller may be the same as that shown in FIG. 2. In the present embodiment, the memory controller 70c includes a cache 72, a prefetch control unit 73, and a control register 74 in addition to the buffer 71. Other points may be the same as in the first embodiment or the second embodiment.

In a memory access to the memory 80, at a time of reading from the memory controller 70c to the memory 80, by reading (prefetching) a little more than an actual access size and storing it in the cache 72, when there is an access to the part that has been read excessively (read hit), reading to the memory 80 does not occur, and low latency can be achieved.

However, when the prefetched data is not used, or when the data is evicted from the cache before being used, the prefetched data is wasted and the access efficiency to the memory 80 is lowered. In the present embodiment, the memory controller 70c controls prefetch based on information such as QoS.

The prefetch control unit 73 of the memory controller 70c determines whether or not to perform prefetch at the time of reading from the memory 80. The control register 74 stores information for identifying a master to be prefetched, a maximum access size at a time of prefetching, and the like. The prefetch is effective when an access request for consecutive addresses occurs, and it is determined whether or not the prefetch is effective according to characteristics of the memory access of the master. In the control register 74, a master that generates an access request for consecutive addresses is set as a master to be prefetched. The prefetch control unit 73 determines whether or not to prefetch a master stored as a target of prefetching in the control register 74. When prefetching is performed, the prefetch control unit 73 temporarily stores the prefetched data in the cache 72. When an access type of the access request is read, the prefetch control unit 73 uses access size information for prefetching the cache 72, thereby increasing the efficiency of the memory access.

More specifically, the prefetch control unit 73 acquires the right use rate from the central bus controller 50c, and predicts whether or not a master to be prefetched issues a large number of access requests. In addition, the prefetch control unit 73 determines whether or not the master to be prefetched issues a large number of access requests from now on based on QoS setting information stored in the QoS information register 502 (refer to FIG. 2), information on a status of granting recently the access rights, and the like. The prefetch control unit 73 examines a master issuing the access request stored in the buffer 71, and examines how much the access request issued by a master different from the master to be prefetched is stored in the buffer 71. For example, the prefetch control unit 73 comprehensively determines the latest right use rate of each master, the future bandwidth of the target master predicted from the QoS setting, the bandwidth of the other master predicted from the QoS setting, the number of access requests which is issued by the target master and which is stored in the buffer 71, and the number of access requests which is issued by the other master and which is stored in the buffer 71, and determines whether or not to perform prefetch.

For example, in a case where a large number of access requests issued by the target master are stored in the buffer 71, the target master issues more access requests, so that there is a high possibility that prefetching is effective. The prefetch control unit 73 may decide to perform prefetch when the target master has issued a large number of access requests. With respect to the QoS setting, for example, when the bandwidth of the target master is large, there is a high possibility that prefetched data is used. When the bandwidth of the master other than the target master is small, data holding time until the data stored in the cache 72 is overwritten when the prefetch is performed is long. The prefetch control unit 73 may decide to perform prefetch when the bandwidth of the target master is large or the bandwidth of the master other than the target master is small. The prefetch control unit 73 may decide whether or not to perform prefetch by comprehensively determining the above-mentioned matters and the like.

[Conclusion]

In the present embodiment, the prefetch control unit 73 determines whether or not to perform prefetch based on the right use rate of the master, the status of granting the access right to the master, and the like. For example, a memory access can be efficiently performed by prefetching when a master is expected to output a large number of read requests to consecutive addresses. In particular, in a case of a DDR memory or the like, if a read size is not equal to or larger than a certain value, the efficiency may be remarkably lowered, so that prefetching is more effective.

Fifth Embodiment

[Bus Generator]

Figure 11:
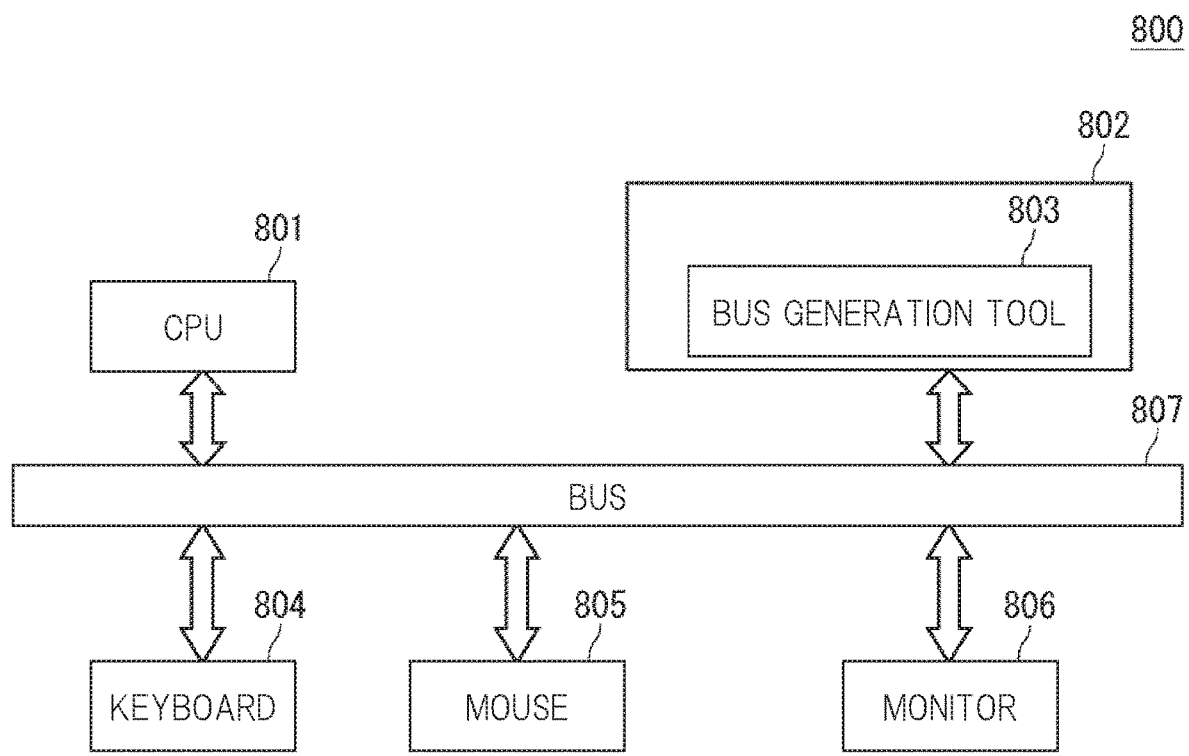
FIG. 11 is a Block diagram showing an example of a hardware configuration of a bus generator.

Next, a fifth embodiment will be described. In the present embodiment, a bus generator for generating circuit information of bus in a semiconductor device from various setting information will be described. FIG. 11 shows an example of a hardware configuration of a bus generator 800. The bus generator 800 is configured as a computer apparatus including, for example, a CPU 801, a memory 802, a keyboard 804, a mouse 805, a monitor 806, and a bus 807. The memory 802 stores a bus generation tool 803 for operating the computer apparatus as the bus generator 800. In the computer apparatus, the CPU 801 executes processing in accordance with the bus generation tool 803 read from the memory 802, so that the computer apparatus can operate as the bus generator 800.

Figure 12:
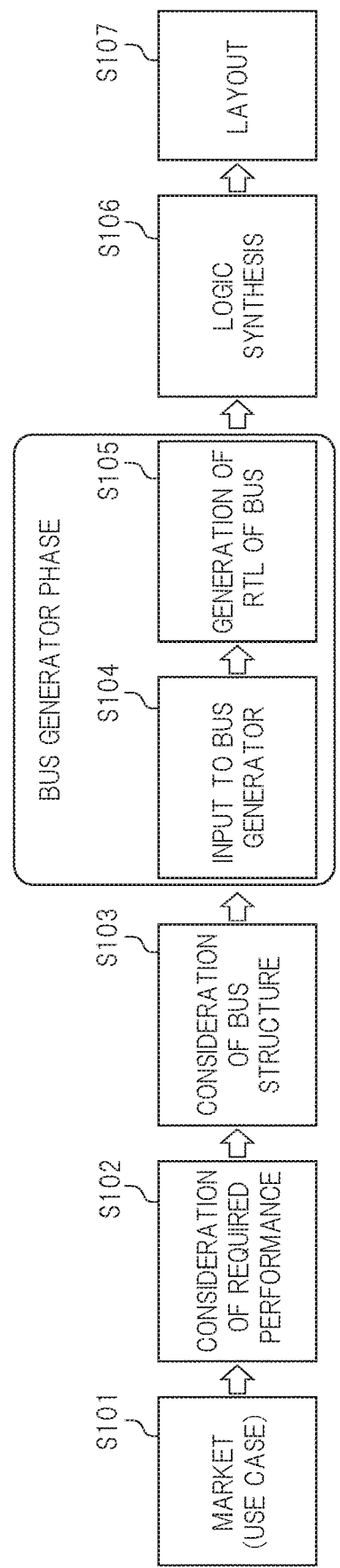
FIG. 12 is a flowchart showing a schematic flow of a bus design.

FIG. 12 shows a schematic flow of bus design. First, a use case or the like in a market is assumed (step S101), and performance required for the bus is considered (step S102). Next, bus structure is considered in accordance with the required performance and the like (step S103). The consideration of the bus structure includes, for example, the consideration of whether or not the central bus controller 50 (refer to FIG. 1) is used.

When the bus structure is determined, setting information necessary for the determined bus structure is input to the bus generator (step S104). The bus generator generates and outputs the circuit information of the bus (step S105). The circuit information is described, for example, in Register Transfer Level (RTL). Thereafter, the circuit information of the bus is logically synthesized (step S106), and then layout design is performed (step S107). Steps S104 and S105 represent phases in which the design is performed using the bus generator.

Figure 13:
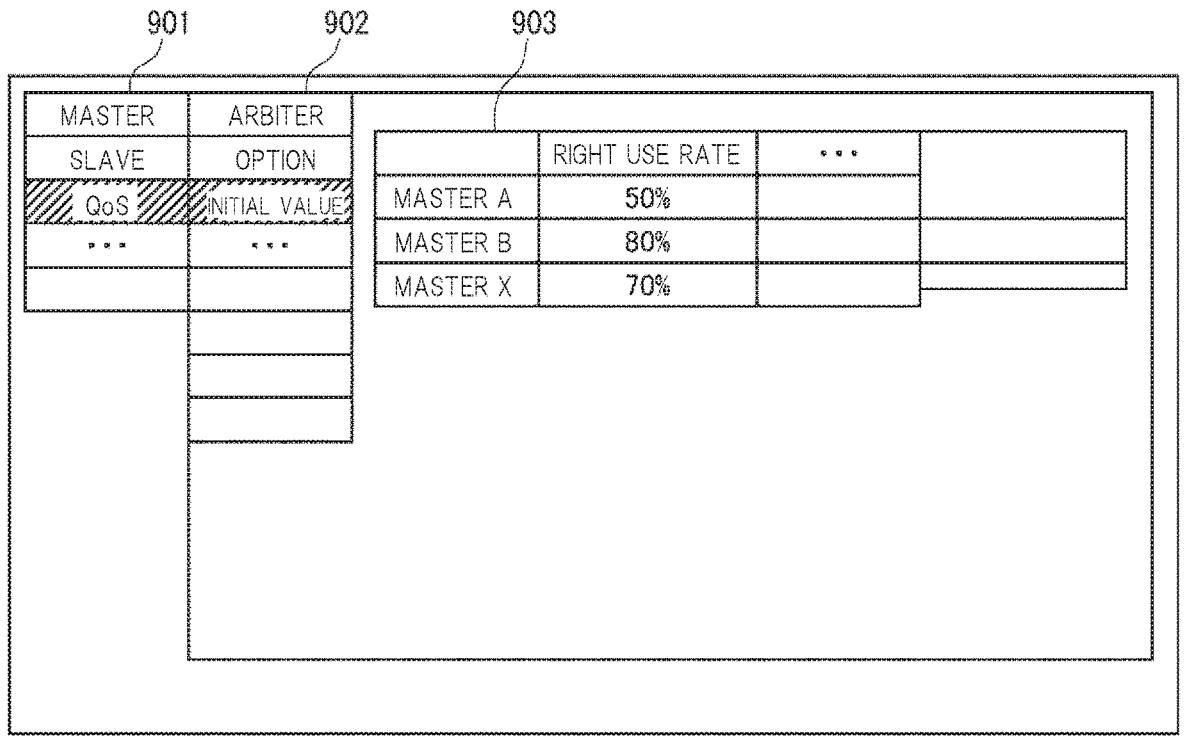
FIG. 13 is a diagram showing an example of a screen for inputting setting information.

FIG. 13 shows an example of a screen for inputting setting information. For example, a screen prompting input of setting information is displayed on the monitor 806 (refer to FIG. 7), and a user gives various settings to the bus generator 800 using the keyboard 804 and the mouse 805. For example, in the screen shown in FIG. 13, when the user selects "QoS" from a menu 901, a sub-menu 902 is displayed. When the user selects "initial value" in the sub-menu 902, an input screen 903 for inputting an access size for each master is displayed. The user can input, for example, information set in the right use rate information register 581 (refer to FIG. 3) on the input screen 903.

The user inputs information on an access destination of a master, information on a clock to be used, information on a bus width, information on functional safety, and the like to the bus generator 800 as information on the master that outputs an access request to a memory, for example. In addition, as information on a slave accessed from a master, information on an address area, information on the clock to be used, information on the bus width, information on the functional safety, and the like are input. Further, as information related to an arbiter, information specifying QoS method, detailed setting of each method, and the like are input.

Figure 14:
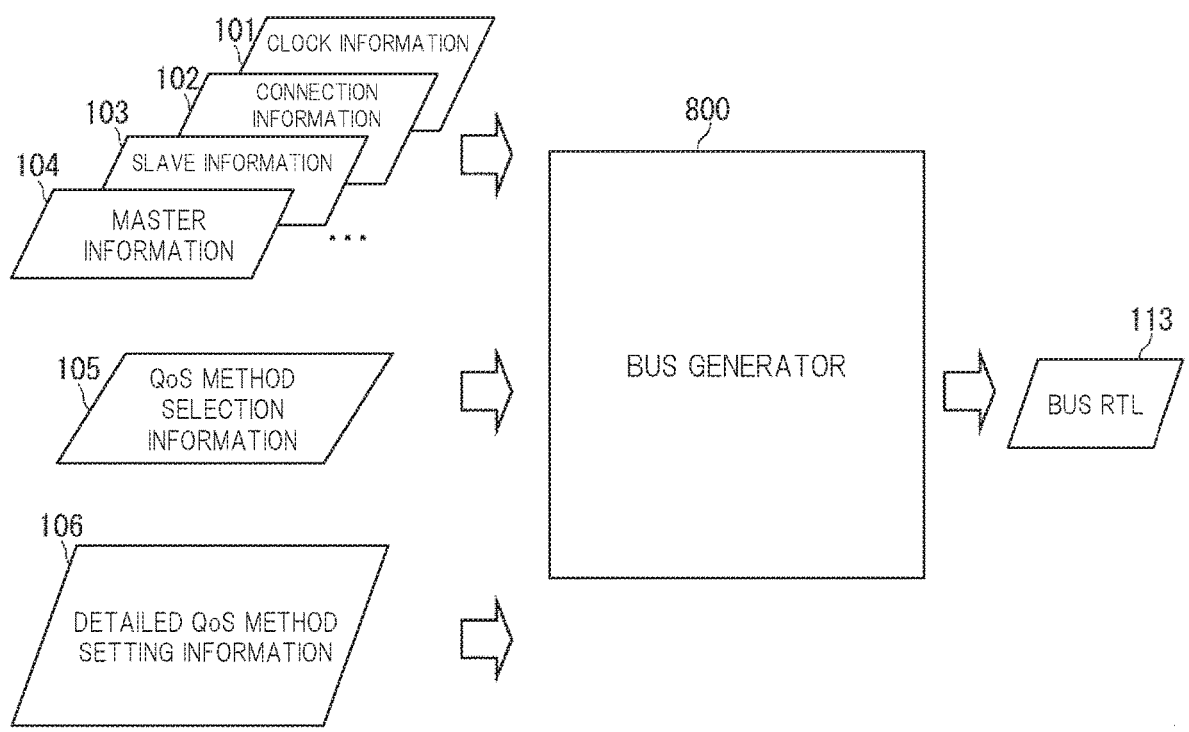
FIG. 14 is a Block diagram showing input data to the bus generator and output data from the bus generator.

FIG. 14 shows input data to the bus generator and output data from the bus generator. The bus generator 800 includes, as functional blocks, for example, a bus structure information generation unit, a bus component generation unit, a central bus controller generation unit, a sub-bus controller generation unit, a merge unit, and the like. The bus generator 800 receives clock information 101, connection information 102, slave information 103, master information 104, QoS method selection information 105, and detailed QoS method setting information 106. These pieces of information are input, for example, through the screen for inputting setting information shown in FIG. 13.

The bus generator 800 uses the clock information 101, the connection information 102, the slave information 103, the master information 104, and the like to generate structure information of the bus for connecting between the master and the slave. In addition, the bus generator 800 generates circuit information of various bus components based on the generated structure information of the bus and circuit information of various functional blocks provided by, for example, a vendor providing various IP cores.

The bus generator 800 generates circuit information of a central bus controller that performs access control in response to an access request output from the master, using the structure information of the bus, the QoS method selection information 105, the circuit information of various functional blocks, and the like. The circuit information of the central bus controller generated by the bus generator 800 indicates, for example, the circuit configuration of the central bus controller 50 shown in FIG. 2.

The bus generator 800 uses the circuit information of the central bus controller to generate circuit information of the sub-bus controller which operates based on control of the central. The circuit information of the sub-bus controller indicates, for example, the circuit configuration of the sub-bus controllers 22, 32, and 42 shown in FIG. 1. The bus generator 800 merges the circuit information of the bus component, the circuit information of the central bus controller, and the circuit information of the sub-bus controller, and outputs the circuit information of the bus (bus RTL 113). The circuit information of the bus (bus RTL 113) describes a circuit portion relating to the bus from each master to the memory 80 in, for example, the electronic apparatus 10 shown in FIG. 1 in RTL.

[Conclusion]

In the present embodiment, the bus generator 800 is used to generate a bus system. By inputting the various setting information and the like to the bus generator 800, it is possible to automatically generate, for example, a bus system between each master and the memory 80 in the electronic apparatus 10 shown in FIG. 1.

Although the invention made by the present inventors has been specifically described based on the embodiment, the present invention is not limited to the above embodiment, and needless to say, various changes may be made without departing from the scope thereof.

What is claimed is:

1. A semiconductor device comprising:
a master that issues an access request to a memory;
a memory controller that is coupled to the master and that accesses the memory according to the access request; and an access control unit that controls an output of the access request issued by the master to the memory controller by granting an access right,
wherein the access control unit manages a number of grantable rights indicating a number to which the access rights can be granted based on a weight of 0 or more and less than 1 according to a probability that the granted access right is used, and grants the access right within a range of the number of grantable rights,
wherein the access control unit comprises:
a request issuance control unit that is coupled between the master and the memory controller and that receives the access request issued by the master; and
a central bus controller that is coupled to the request issuance control unit and that grants an access right to the request issuance control unit,
wherein, when the access right is granted to the request issuance control unit from the central bus controller, the request issuance control unit outputs the access request received from the master to the memory controller and outputs a first notification signal indicating that the access right has been used to the central bus controller, and
wherein the central bus controller comprises:
a grant availability determination unit that calculates, as the number of grantable rights, a difference between a maximum number of grantable rights indicating a maximum number to which the access rights can be granted and a number of access rights being granted, that compares the number of grantable rights with the weight to determine whether to grant the access right to the request issuance control unit, and that adds the weight to the number of access rights being granted every time the access right is granted to the master; and
a correction amount and return amount calculation unit that adds a difference between the weight and 1 to the number of access rights being granted in response to the first notification signal.

2. The semiconductor device according to claim 1, wherein the request issuance control unit outputs a second notification signal indicating that the access right is returned without using the access right to the central bus controller when the access right is granted from the central bus controller and the access request is not received from the master, and
wherein the correction amount and return amount calculation unit subtracts the weight from the number of access rights being granted in response to the second notification signal.

3. The semiconductor device according to claim 2, wherein the central bus controller acquires a history of the first and second notification signals, calculates a rate at which the access right is used based on the history of the first and second notification signals, and generates the weight based on the calculated rate at which the access right is used.

4. The semiconductor device according to claim 3, wherein the central bus controller further comprises a use and return history storage unit that stores the history of the first and second notification signals.

5. The semiconductor device according to claim 1, wherein the memory controller includes a request buffer for receiving and storing the access request, and outputs to the central bus controller a release notification signal indicating that the request buffer is released when a memory access based on the access request stored in the request buffer is processed and an entry of the request buffer is released, and wherein the correction amount and return amount calculation unit decreases the number of rights being granted by one when receiving the release notification signal from the memory controller.

6. The semiconductor device according to claim 1,
wherein the master comprises a first master,
wherein the request issuance control unit comprises a first request issuance control unit, and
wherein the semiconductor device further comprises:
an interconnect that is coupled between the first master and the memory controller; and
a second master that issues the access request to the memory,
wherein the access control unit further comprises a second request issuance control unit that is coupled between the second master and the interconnect, and that receives the access request issued by the second master,
wherein the central bus controller is coupled to the second request issuance control unit, and grants the access right to the second request issuance control unit,
wherein, when the access right is granted to the first request issuance control unit from the central bus controller, the first request issuance control unit outputs the access request received from the first master to the interconnect,
wherein, when the access right is granted to the second request issuance control unit from the central bus controller, the second request issuance control unit outputs the access request received from the second master to the interconnect, and
wherein the interconnect that arbitrates the access requests issued by the first and second masters and that outputs an arbitrated access request to the memory controller.

7. The semiconductor device according to claim 6, wherein the weight is set for each of the first and second masters.

8. The semiconductor device according to claim 1,
wherein the memory controller comprises:
a cache; and
a prefetch control unit that controls prefetch for acquiring data greater in size than the access size data of the access request from the memory and storing the acquired data in the cache when the access request is a read, and
wherein the prefetch control unit determines whether to perform the prefetch based on the probability that the access right is used and a status of granting the access right.

9. The semiconductor device according to claim 1, wherein the central bus controller further comprises a grantable maximum number setting register that is coupled to the grant availability determination unit, and that stores the maximum number of grantable rights.

10. The semiconductor device according to claim 1, wherein the central bus controller further comprises a granting right number register that is coupled to the grant availability determination unit and the correction amount and return amount calculation unit, and that stores the number of access rights being granted.

11. The semiconductor device according to claim 1, wherein the central bus controller further comprises a right use rate information register that stores the weight.

* * * * *